US009020143B2

(12) United States Patent
Patil et al.

(10) Patent No.: US 9,020,143 B2
(45) Date of Patent: Apr. 28, 2015

(54) METHOD AND SYSTEM FOR PROVIDING ADVANCED ADDRESS BOOK FUNCTIONALITY IN A UNIVERSAL PLUG AND PLAY HOME NETWORK ENVIRONMENT

(75) Inventors: Mayuresh Madhukar Patil, Bangalore (IN); Arun Prasath Ramamoorthy, Bangalore (IN); Je-Young Maeng, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 477 days.

(21) Appl. No.: 13/220,149

(22) Filed: Aug. 29, 2011

(65) Prior Publication Data

US 2012/0057692 A1 Mar. 8, 2012

(30) Foreign Application Priority Data

Aug. 28, 2010 (IN) .......................... 2500/CHE/2010

(51) Int. Cl.

| | |
|---|---|
| ***G06F 7/00*** | (2006.01) |
| ***H04M 1/00*** | (2006.01) |
| ***H04L 12/28*** | (2006.01) |
| ***G06Q 10/10*** | (2012.01) |
| *H04L 29/08* | (2006.01) |

(52) U.S. Cl.
CPC ............ *H04L 12/2805* (2013.01); *G06Q 10/10* (2013.01); *H04L 67/1095* (2013.01)

(58) Field of Classification Search
None
See application file for complete search history.

(56) References Cited

U.S. PATENT DOCUMENTS

| | | | | |
|---|---|---|---|---|
| 6,687,362 | B1 * | 2/2004 | Lindquist et al. | 379/218.01 |
| 7,756,928 | B1 * | 7/2010 | Meenan et al. | 709/205 |
| 2006/0194596 | A1 * | 8/2006 | Deng | 455/466 |
| 2007/0200920 | A1 * | 8/2007 | Walker et al. | 348/14.08 |
| 2010/0153528 | A1 * | 6/2010 | Pearson et al. | 709/223 |
| 2010/0208746 | A1 | 8/2010 | Rahman | |
| 2011/0202956 | A1 * | 8/2011 | Connelly et al. | 725/38 |
| 2011/0219074 | A1 * | 9/2011 | Wang et al. | 709/204 |

FOREIGN PATENT DOCUMENTS

WO WO 2010057396 A1 * 5/2010

OTHER PUBLICATIONS

Kawahara et al., "Network Management Architecture Toward Universal Communication", Proceedings of the 3rd International Universal Communication Symposium, Jan. 1, 2009.
Song et al., "Using SNS as Access Control Mechanism for DLNA Content Sharing System", 6th IEEE Consumer Communications and Networking Conference, Jan. 10, 2009.

* cited by examiner

*Primary Examiner* — Fan Tsang
*Assistant Examiner* — Jeffrey Lytle
(74) *Attorney, Agent, or Firm* — The Farrell Law Firm, P.C.

(57) ABSTRACT

Methods and apparatus are provided for a managing at least one network address book of a user at a TS in a UPnP home network. A request to update a contact entry is received from a TCP that is coupled to the TS in the UPnP home network. The request includes contact information associated with at least one entity of the contact entry, and an identifier of a source of the contact entry. It is determined whether the identifier in the request is associated with any of one or more network address books in one or more WAN servers coupled to the TS via a WAN. When the identifier is associated with at least one of the one or more network address books, the contact entry in the at least one network address book is updated based on the contact information. When the identifier is not associated with any of the one or more network address books, the contact entry in a local address book in the TS is updated based on the contact information.

19 Claims, 23 Drawing Sheets

```
<?xml version="1.0" encoding="UTF-8"?>
<AddressBook:incomingRequests
    http://www.upnp.org/schemas/phone/addressbook-v1.xsd"
    xmlns:xsi="http://www.w3.org/2001/XMLSchema-instance"
    xmlns:AddressBook="urn:schemas-upnp-org:phone:addressbook"
    xmlns:peer="urn:schemas-upnp-org:phone:peer">
<Request>
     <type>"Contact Invitation"</type>
     <ReqID="123"/>
     <fromcontactid>
              <peer:id>contact id of the requester<peer:/id>
     </fromcontactid>
     <status>pending/Accepted/Rejected</status>
     <note>informative text information, e.g. sharing jeyoung's mobile number
     </note>
     <sharedinformationURL>URL pointing to additional information for e.g shared contact
information…
     </sharedinformationURL>
</Request>
<Request>
     <type>"Contact Share"</type>
     <ReqID="123"/>
     <fromcontactid>
     <peer:id>contact id of the requester<peer:/id>
     </fromcontactid>
     <status>pending</status>
     <note>informative text information, e.g. sharing jeyoung's mobile number
     </note>
     <sharedinformationURL>…</sharedinformationURL>
</Request>
    ------- ANY OTHER INCOMING REQUESTS GOES HERE -------
</incomingRequests>
```

FIG.19

METHOD AND SYSTEM FOR PROVIDING ADVANCED ADDRESS BOOK FUNCTIONALITY IN A UNIVERSAL PLUG AND PLAY HOME NETWORK ENVIRONMENT

PRIORITY

This application claims priority under 35 U.S.C. §119(a) to Indian Provisional Application No. 2500/CHE/2010, filed on Aug. 28, 2010, and Indian Patent Complete Application No. 2500/CHE/2010, filed May 18, 2011, the contents of which are incorporated herein by reference.

BACKGROUND OF THE INVENTION

1. Field of the Invention

The present invention relates generally to the field of Universal Plug and Play (UPnP) communication, and more particularly to the providing of address book functionality in an UPnP home network environment.

2. Description of the Related Art

UPnP telephony has recently enhanced the telephony experience in the home. UPnP telephony has also developed a corresponding address book feature referred to as a phone data model. The phone data model is a profiling standard that allows a user to access phone settings using a Television (TV), for example. The TV acts as a Telephony Control Point (TCP) that controls phone related settings in a Telephony Server (TS), such as, for example a mobile phone.

The phone data model also defines an address book, which is able to be managed by the user from TCP devices, such as the TV. A Configuration Management Service (CMS), which is defined by the UPnP forum, allows the user to access the address book to add a new contact entry, delete an existing contact entry, and browse contacts. However, current UPnP telephony is not able to access a network address book that resides on a Wide Area Network (WAN) server or an address book that differs from the UPnP telephony address book, such as a social networking address book.

SUMMARY OF THE INVENTION

The present invention has been made to address at least the above problems and/or disadvantages and to provide at least the advantages described below. Accordingly, an aspect of the present invention provides a method is provided for managing at least one network address book of a user at a TS in a UPnP home network. A request to update a contact entry is received from a TCP that is coupled to the TS in the UPnP home network. The request includes contact information associated with at least one entity of the contact entry, and an identifier of a source of the contact entry. It is determined whether the identifier in the request is associated with any of one or more network address books in one or more WAN servers coupled to the TS via a WAN. When the identifier is associated with at least one of the one or more network address books, the contact entry in the at least one network address book is updated based on the contact information. When the identifier is not associated with any of the one or more network address books, the contact entry in a local address book in the TS is updated based on the contact information.

According to another aspect of the present invention, a TS is provided for managing one or more network address books associated with a TCP in a UPnP home network. The TS includes a processor and a memory coupled to the processor. The memory includes a Network Address Book (NAB) management module capable of receiving a request to update a contact entry from the TCP that is coupled to the TS, wherein the request comprises contact information associated with at least one entity of the contact entry and an identifier of a source of the contact entry; determining whether the identifier in the request is associated with any of one or more network address books in one or more Wide Area Network (WAN) servers coupled to the TS via a WAN; when the identifier is associated with at least one of the one or more network address books, updating the contact entry in the at least one network address book based on the contact information; and when the identifier is not associated with any of the one or more network address books, updating the contact entry in a local address book in the TS based on the contact information.

According to an additional aspect of the present invention, a non-transitory computer-readable storage medium is provided having instructions stored therein, that when executed by a TS, cause the TS to perform a method including receiving a request to update a contact entry from a TCP that is coupled to the TS, wherein the request comprises contact information associated with at least one entity of the contact entry and an identifier of a source of the contact entry; determining whether the identifier in the request is associated with any of one or more network address books in one or more WAN servers coupled to the TS via a WAN; when the identifier is associated with at least one of the one or more network address books, updating the contact entry in the at least one network address book based on the contact information; and when the identifier is not associated with any of the one or more network address books, updating the contact entry in a local address book in the TS based on the contact information.

According to a further aspect of the present invention, a method is provided for sharing contacts entries at a TS. A request is received from a TCP coupled to the TS in a UPnP home network to share at least one contact element associated with a contact entry with at least one recipient. The at least one contact element is received from a network address book in a WAN server connected to the TS or from a local address book in the TS. The at least one contact element is shared with the at least one recipient.

According to another aspect of the present invention, a TS is provided for sharing of contacts entries. The TS includes a processor and a memory coupled to the processor. The memory includes a NAB management module capable of receiving a request from a TCP coupled to the TS in a UPnP home network to share at least one contact element associated with a contact entry with at least one recipient; retrieving the at least one contact element from a network address book in a WAN server connected to the TS or from a local address book in the TS; and sharing the at least one contact element with the at least one recipient.

Additionally, according to another embodiment of the present invention, a non-transitory computer-readable storage medium is provided having instructions stored therein, that when executed by a TS, cause the TS to perform a method including receiving a request from a TCP coupled to the TS in a UPnP home network to share at least one contact element associated with a contact entry with at least one recipient; retrieving the at least one contact element from a network address book in a WAN server connected to the TS or from a local address book in the TS; and sharing the least one contact element with the at least one recipient.

BRIEF DESCRIPTION OF THE DRAWINGS

The above and other aspects, features and advantages of the present invention will be more apparent from the following detailed description when taken in conjunction with the accompanying drawings, in which:

FIG. 19 is a diagram illustrating a scheme for handling incoming requests for the system of FIGS. 9 and 10, according to an embodiment of present invention.

DETAILED DESCRIPTION OF EMBODIMENTS OF THE PRESENT INVENTION

Figure 1:
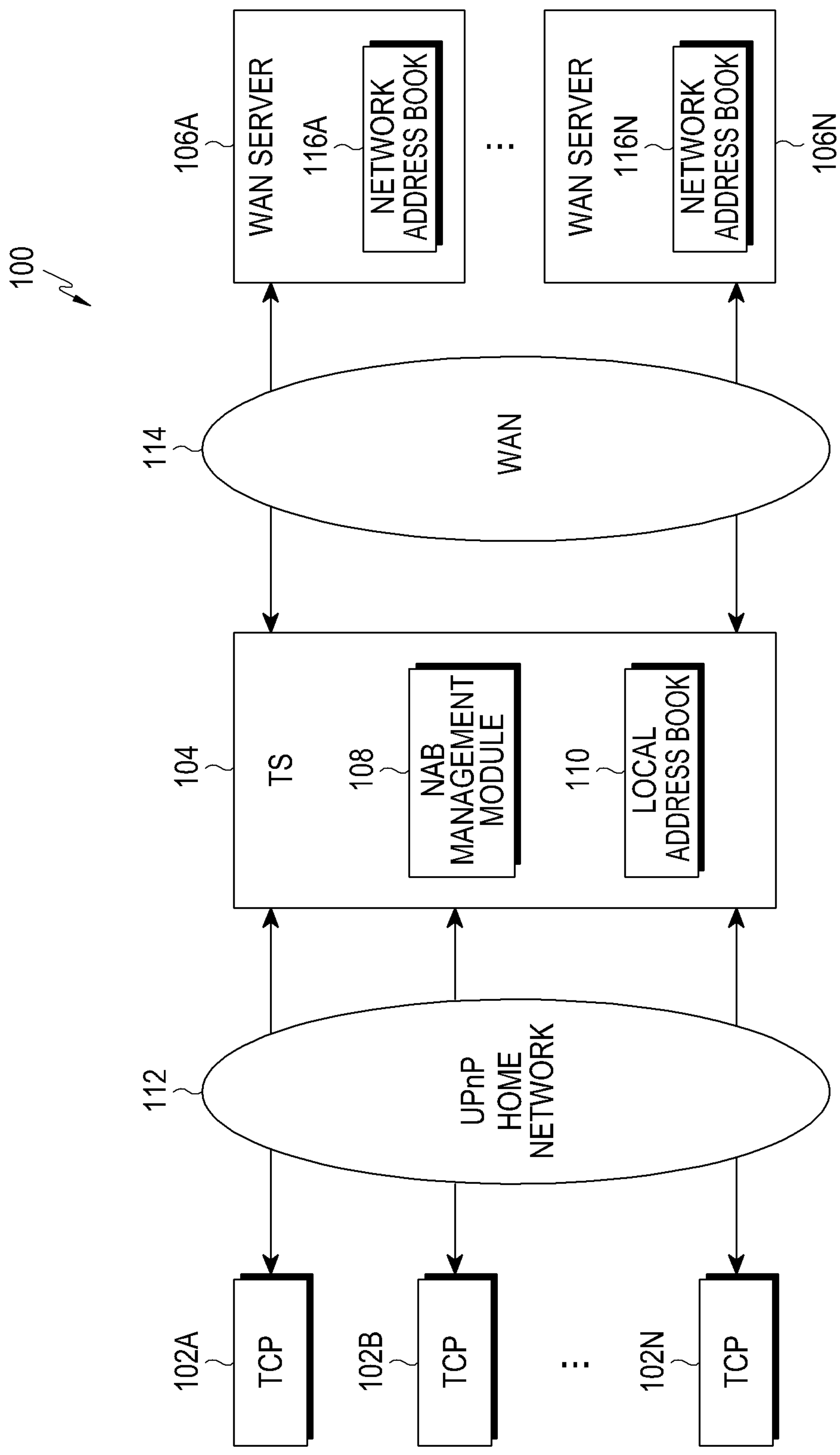
FIG. 1 is a block diagram illustrating a system for managing one or more network address books associated with TCPs, according to an embodiment of the present invention.

Embodiments of the present invention are described in detail with reference to the accompanying drawings. The same or similar components may be designated by similar reference numerals although they are illustrated in different drawings. Detailed descriptions of constructions or processes known in the art may be omitted to avoid obscuring the subject matter of the present invention.

Embodiments of the present invention provide a method and system for providing advanced address book functionality in a UPnP home network environment. In the following detailed description of the embodiments of the present invention, reference is made to the accompanying drawings in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

FIG. 1 is a block diagram illustrating a system 100 for managing one or more network address books associated with TCPs 102A-102N, according to an embodiment of the present invention. The system 100 includes the TCPs 102A-102N, a TS 104, and WAN servers 106A-106N. The TS 104 includes a NAB management module 108 and a local address book 110. The WAN servers 106A-106N each include a network address book 116A-116N, respectively, associated with one or more TCPs 102A-102N. A network address book may be a service provider address book (e.g., a converged address book formed by online mobile alliance enablers) or a social network address book associated with one or more social networking sites, such as Facebook®, Orkut®, Friendster®, MySpace®, Twitter®, etc. The network address book stores contact entries associated with entities linked to users of the TCPs 102A-102N. As shown in FIG. 1, the TCPs 102A-102N are connected to the TS 104 via a UPnP home network 112. The TS 104 is connected to the WAN servers 106A-106N via a WAN 114.

In an embodiment of the present invention, the NAB management module 108 enables a user of the TCP 102A to add or modify a contact entry associated with an entity in the network address book 116A. In another embodiment of the present invention, the NAB management module 108 enables the user of the TCP 102A to remove a contact entry from the network address book 116A. In an additional embodiment of the present invention, the NAB management module 108 enables the user of the TCP 102A to import contact entries from any of the network address book 116A-116N to the local address book 110. In a further embodiment of the present invention, the NAB management module 108 enables the user of the TCP 102A to search for one or more contact entries in the one or more network address books 116A-116N.

In yet another embodiment of the present invention, the NAB management module 108 provides the user of the TCP 102A with a contact invitation from another entity via one of the network address books 116A-116N. In still a further embodiment of the present invention, the NAB management module 108 enables the user to share one or more contact elements (e.g., a mobile number, an email ID, a twitter ID, an address, etc.) with one or more entities. Also, the NAB management module 108 may share a contact element from an entity with the user of the TCP 102A. The steps of managing the network address books by the NAB management module 108, according to above described embodiments of the present in invention, are described in greater detail below.

Figure 2:
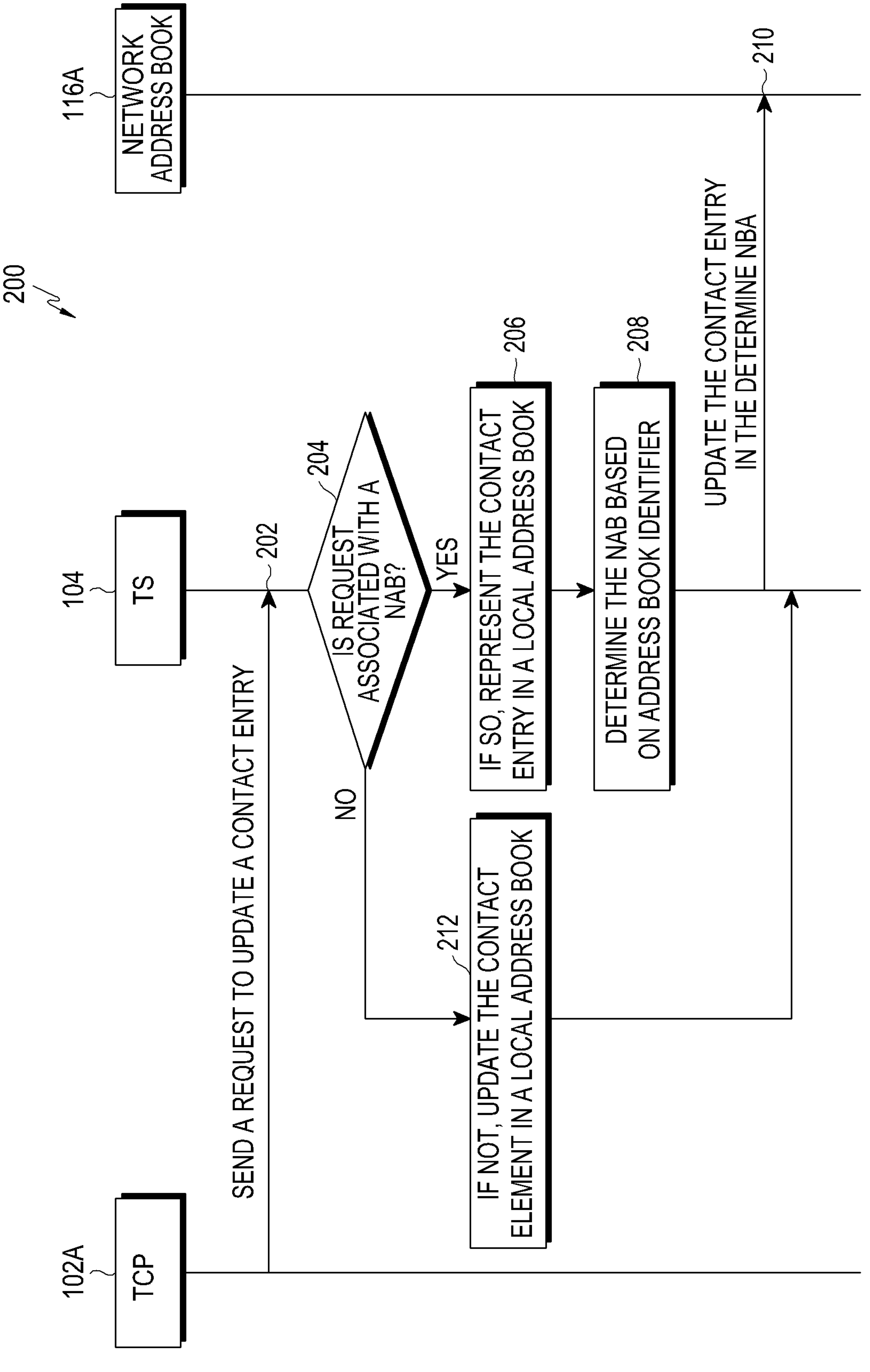
FIG. 2 is a flow diagram illustrating a method of updating a contact entry in a network address book, according to an embodiment of the present invention.

FIG. 2 is a flow diagram 200 illustrating a method of updating a contact entry in a network address book, according to an embodiment of the present invention. For this embodiment of the present invention, it is assumed that a user of the TCP 102A wishes to update a contact entry associated with an entity (e.g., an individual, a group, an organization, etc.) in one of the user's network address books 116A-116N. In step 202, the TCP 102A sends a request for updating the contact entry associated with the entity to the TS 104. The request includes contact information associated with the entity and a network address book identifier or source of the contact information. In step 204, the TS 104 determines whether the address book identifier in the request is associated with one of the network address books 116A-116A in one of the WAN servers 106A-106N. Specifically, the TS 104 determines whether the contact entry has to be updated in one of the network address books 116A-116N.

When one of the network address books 116A-116N is to be updated, the TS 104 represents the contact entry in the local address book 110 based on the contact information associated with the entity, in step 206. In step 208, the TS 104 determines a network address book (e.g., the network address book 116A) from the network address books 116A-116N based on the address book identifier in the received request. In step 210, the TS 104 synchronizes the contact entry represented in the local address book with the determined network address book 116A using the WAN. When none of the network address books 116A-116N are to be updated in step 204, the TS 104 updates the contact entry in the local address book 110, in step 212. When the request for updating a contact entry is received, the TS 104 may add, delete or modify the contact entry based on the request.

Figure 3:
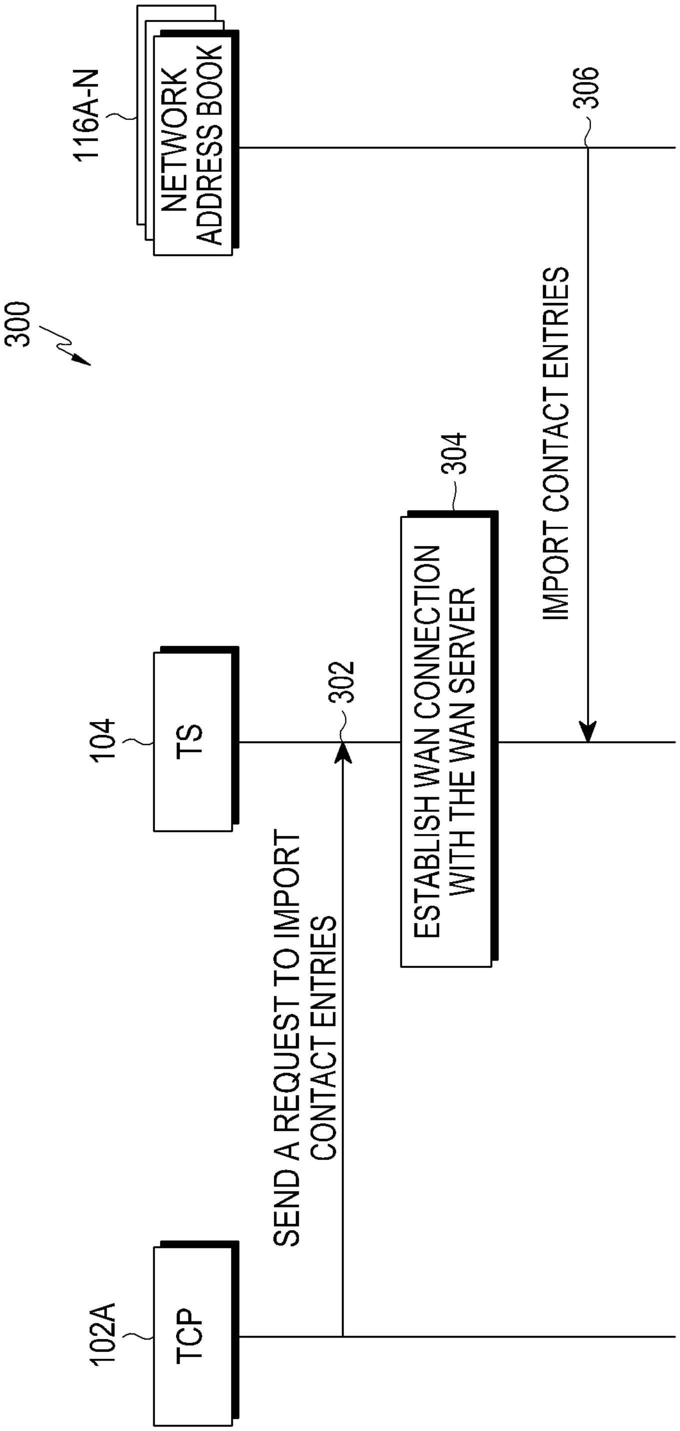
FIG. 3 is a flow diagram illustrating a method of importing contact entries from the one or more network address books to a local address book, according to an embodiment of the present invention.

FIG. 3 is a flow diagram 300 illustrating a method of importing contact entries from the network address books 116A-116N to the local address book 110, according to an embodiment of the present invention. In step 302, the TCP 102A sends a request for importing contact entries from the one or more network address books 116A-116N. In step 304, the TS 104 establishes a WAN connection with the WAN servers 106A-106N, which respectively include the one or more network address books 116A-116N. In step 306, the TS 104 imports the contact entries from the one or more network address books 116A-116N, as per the request.

Figure 4:
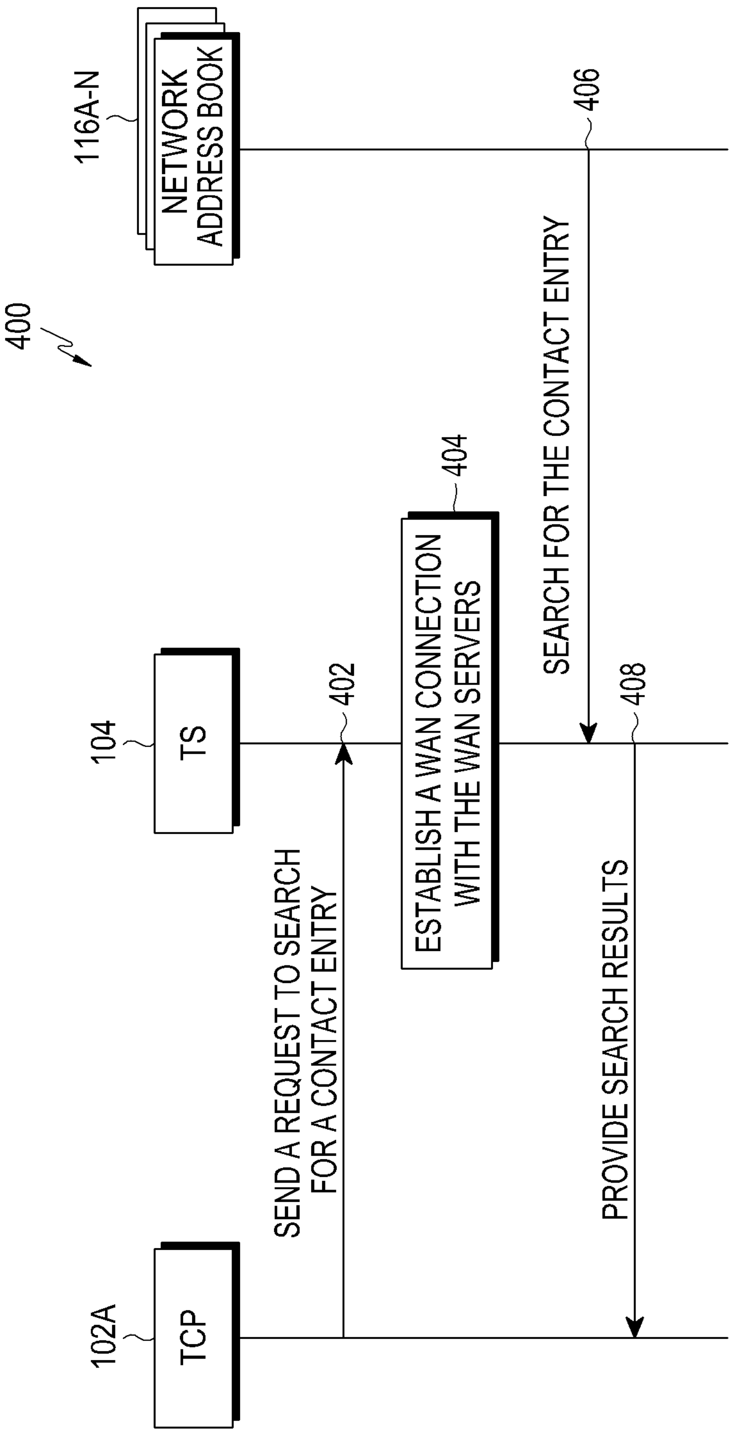
FIG. 4 is a flow diagram illustrating a method of searching a contact entry in the one or more address books, according to an embodiment of the present invention.

FIG. 4 is a flow diagram 400 illustrating a method of searching a contact entry in the one or more address books 116A-116N, according to an embodiment of the present invention. In step 402, the TCP 102A sends a request for searching for a contact entry in the one or more network address books 116A-116N. For example, the request may include a contact search query. In step 404, the TS 104 establishes a WAN connection with the WAN servers 106A-106N, which respectively include the network address books 116A-116N. In step 406, the TS 104 searches for the contact entry in the address books 116A-116N based on the contact search query. In step 408, the TS 104 provides the search results to the TCP 102A, upon successfully searching the one or more network address books 116A-116N.

Figure 5:
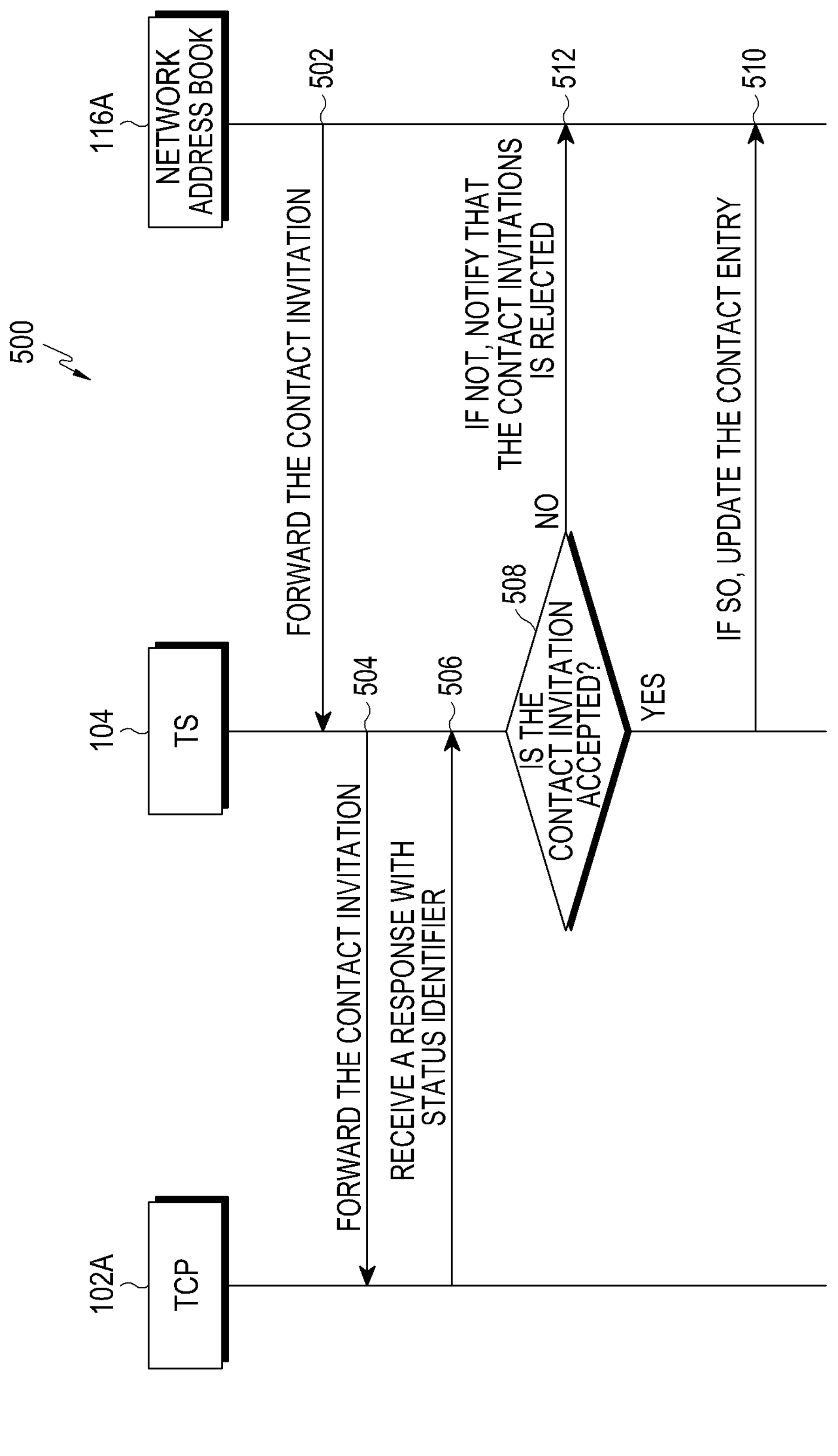
FIG. 5 is a flow diagram illustrating a method of handling a contact invitation received from an entity via a network address book, according to an embodiment of the present invention.

FIG. 5 is a flow diagram 500 illustrating a method of handling a contact invitation received from an entity via the network address book 116A, according to an embodiment of the present invention. In step 502, the TS 104 receives a contact invitation from the network address book 116A. For example, the contact invitation includes a contact entry associated with the entity. In step 504, the TS 104 forwards the received contact invitation to the TCP 102A. In step 506, the TCP 102A sends a response including a status identifier to the TS 104, in response to the contact invitation. In step 508, the TS 104 determines whether the contact invitation is accepted by the TCP 102A based on the status identifier in the response.

When the contact invitation is accepted, then the TS 104 adds the contact entry associated with the contact invitation to the network address book 116A, in step 510. When the contact invitation is rejected or declined, the TS 104 notifies to the network address book 116A that the contact invitation is rejected by the TCP 102A, in step 512.

Figure 6:
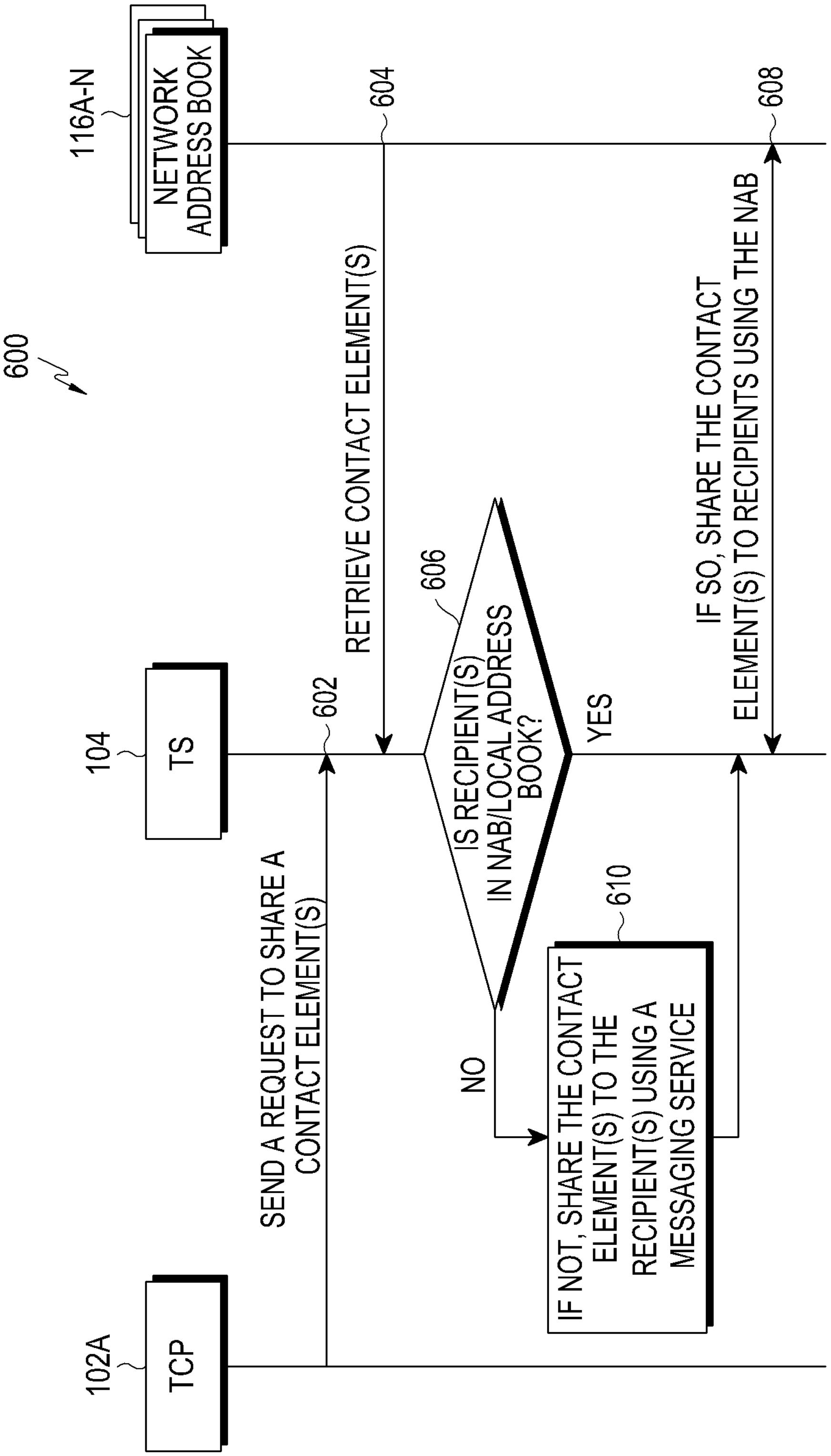
FIG. 6 is a flow diagram illustrating a method of sharing a contact element associated with a contact entry with an entity, according to an embodiment of the present invention.

FIG. 6 is a flow diagram 600 illustrating of a method of sharing at least one contact element associated with a contact entry, according to an embodiment of the present invention. In step 602, the TCP 102A sends a request to share at least one contact element associated with a contact entry with a at least one recipient. For example, the request may include a reference identifier, at least one recipient identifier associated with an individual recipient entity or a group of recipient entities, at least one contact element to be shared, a mode of sharing (e.g., electronic mail, Short Message Service (SMS), network address book communication, etc.), and the like. In step 604, the TS 104 retrieves the at least one contact element associated with the contact entry from at least one of the network address books 116A-116N in the WAN servers 106A-106N, or the local address book 110.

In step 606, the TS 104 determines whether the at least one recipient is associated with a contact entry in at least one of the network address books 116A-116N or the local address book 110. When the at least one recipient is associated with the contact entry, the TS 104 shares the at least one contact element associated with the contact entry with the at least one recipient using the network address book 116A or the local address book 110, in step 608. When the at least one recipient is not associated with the contact entry, the TS 104 shares the at least one contact element associated with the contact entry with the at least one recipient using a messaging service (e.g., email or SMS). Alternatively, the TS 104 may share the at least one contact element associated with the contact entry with the at least one recipient based on a sharing mode indicated in the request. Although, the description of FIG. 6 relates to the sharing of at least one contact element from a contact entry, the contact entry including all the contact elements can also be shared with the at least one recipient.

Figure 7:
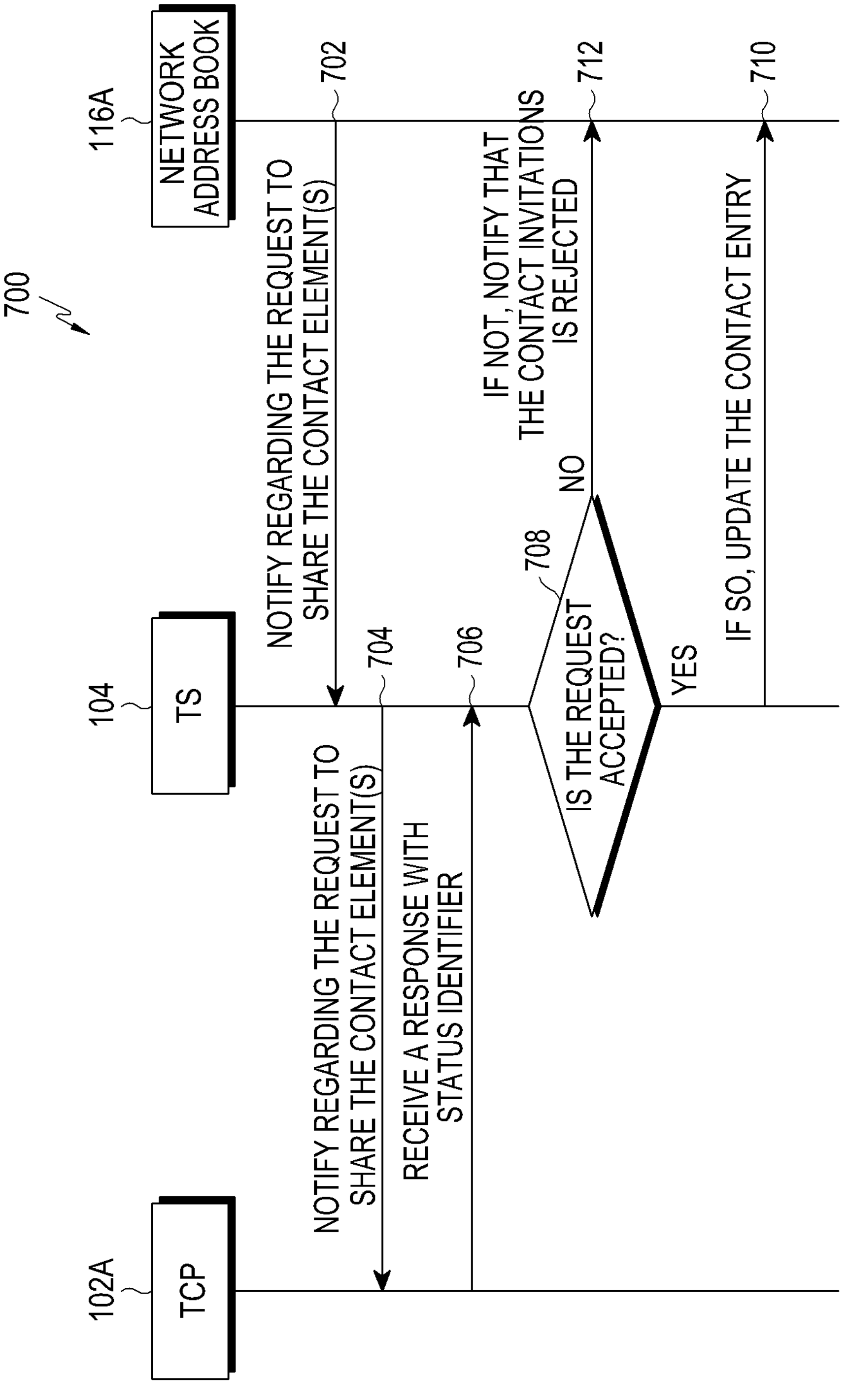
FIG. 7 is a flow diagram illustrating a method of sharing a contact element by an entity with a TCP via a network address book, according to an embodiment of the present invention.

FIG. 7 is a flow diagram 700 illustrating a method of sharing a contact element by an entity via the network address book 116A, according to an embodiment of the present invention. In step 702, the TS 104 receives a request to share at least one contact element from the network address book 116A. For example, the request includes the at least one contact element and a recipient identifier. In step 704, the TS 104 notifies one of the TCPs 102A-102N (e.g., TCP 102A), based on the recipient identifier, of the request to share the at least one contact element. In step 706, the TCP 102A sends a request (response to the incoming share request) including an incoming requests identifier to the TS 104, in response to the notification. In step 708, the TS 104 determines whether the request to share the at least one contact element is accepted by the TCP 102A, based on the incoming request identifier in the response.

When the request to share the at least one contact element is accepted, the TS 104 adds the contact element associated with the entity to the network address book 116A, in step 710. When the request to share the at least one contact element is rejected or declined, the TS 104 notifies the network address book 116A that the request to share the at least one contact element is rejected by the TCP 102A, in step 712.

Figure 8:
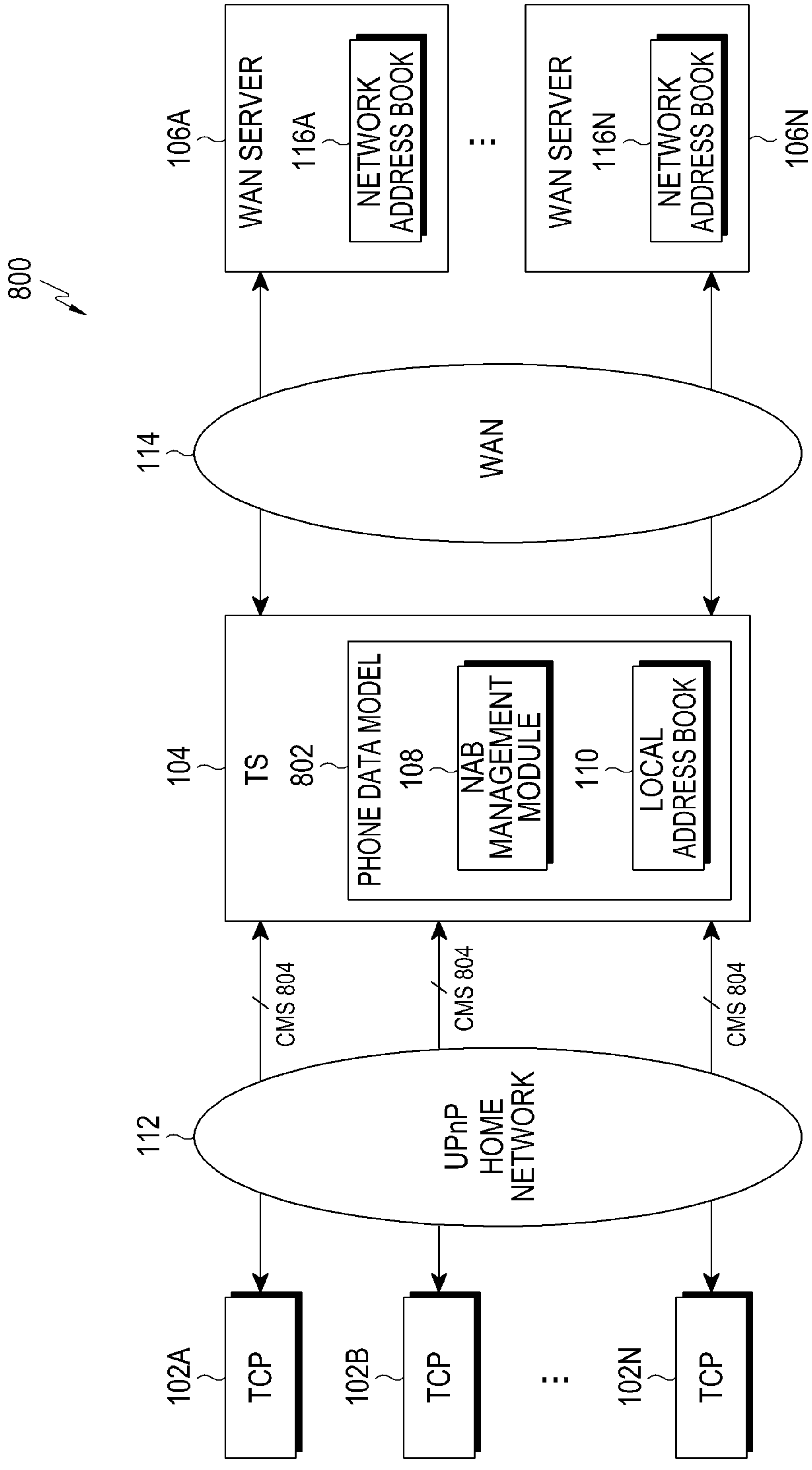
FIG. 8 is a block diagram illustrating a system for managing the one or more network address books associated with the TCPs using a CMS interface, according to an embodiment of the present invention.

FIG. 8 is a block diagram illustrating a system 800 for managing the network address books 116A-116N associated with the TCPs 102A-102N using a CMS interface 804, according to an embodiment of the present invention. The TS 104 includes a phone data model 802, which includes the NAB management module 108 and the local address book 110. The NAB management module 108 is an extension to a currently known phone data model in the TS 104, which can be achieved by extending address book functionality to the phone data model 802. The NAB management module 108 in the phone data model provides advanced address book functionality, according to one or more of the embodiments described in FIGS. 1-7.

Figure 12A:
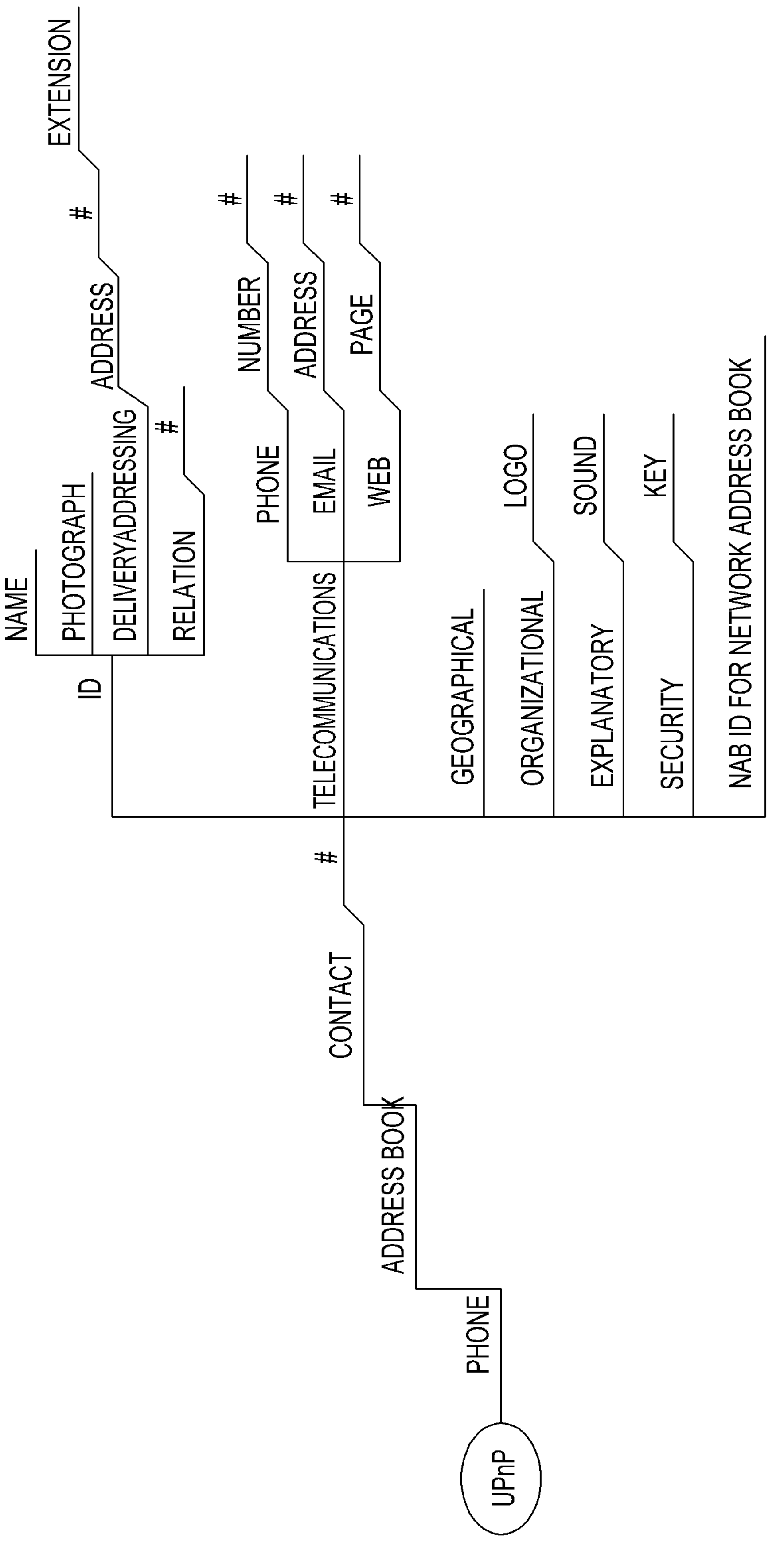
FIGS. 12A-12D are diagrams illustrating schemas for updating contact entries in a network address book based on a request from a TCP, according to an embodiment of the present invention.

In order to provide advanced network address book functionality, the TCP 102A and TS 104 communicate over a CMS interface 804. In an embodiment of the present invention, a new element "NetworkAddressBookID/SourceID" associated with the parent element "contact" with a network address book identifier is defined for representing a network address book in the local address book 110, as illustrated in FIG. 12A. Alternatively, the new element can include a Boolean value indicating whether the contact entry has to be stored in the network address book. Instead of a new element, a global element can be defined that indicates that the whole local address book is to be synchronized with the network address book. The global element can be defined in the address book element of the phone data model 802, as illustrated in FIG. 12D.

Figure 12B:
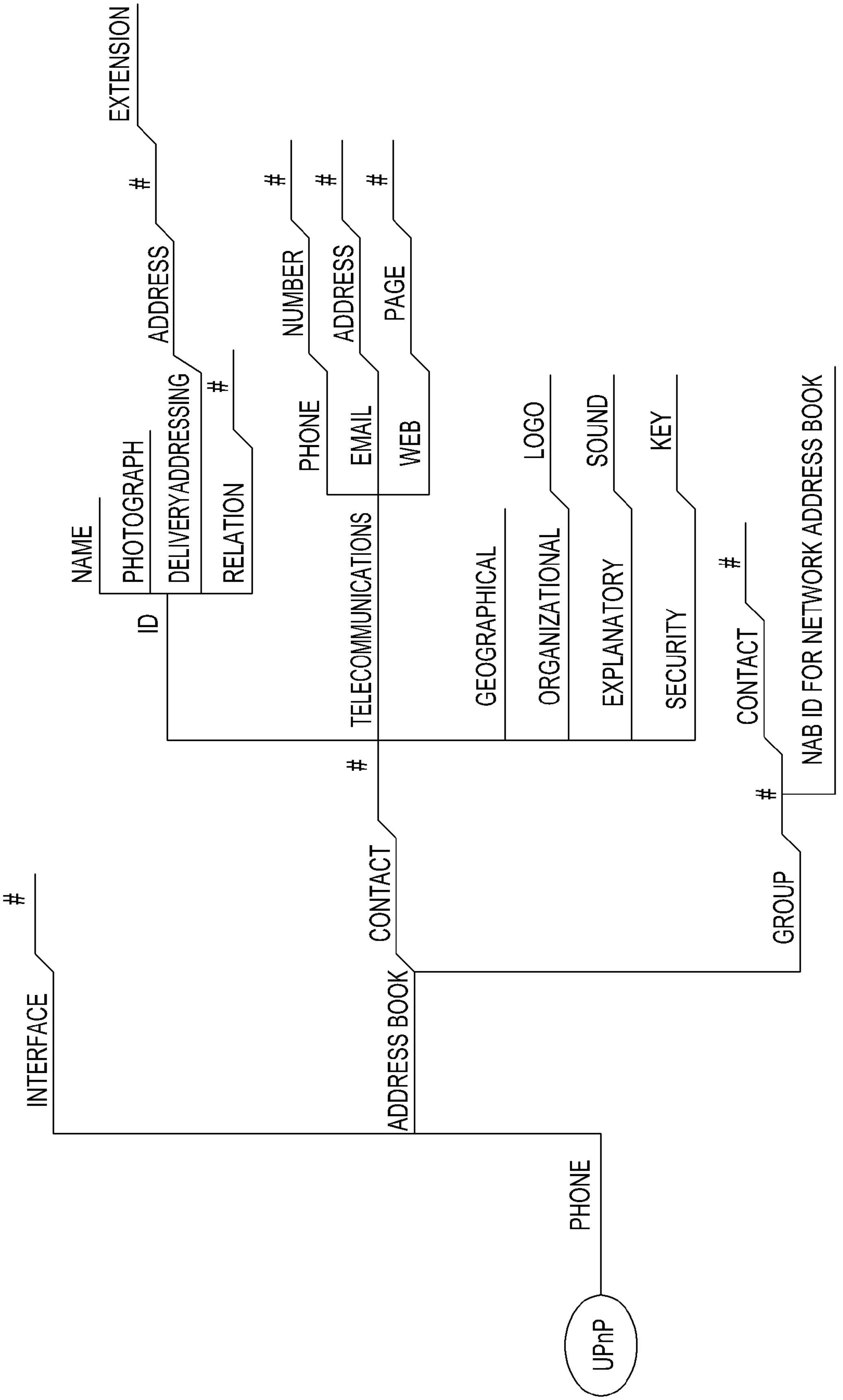

In another embodiment of the present invention, the request from the TCP 102A includes a group element as a child of a parent element with a network address book identifier, as illustrated in FIG. 12B. This helps to represent contact entries from a particular address book as a single group element. Alternatively, the group element may include a name of a network address book identifier.

Figure 12C:
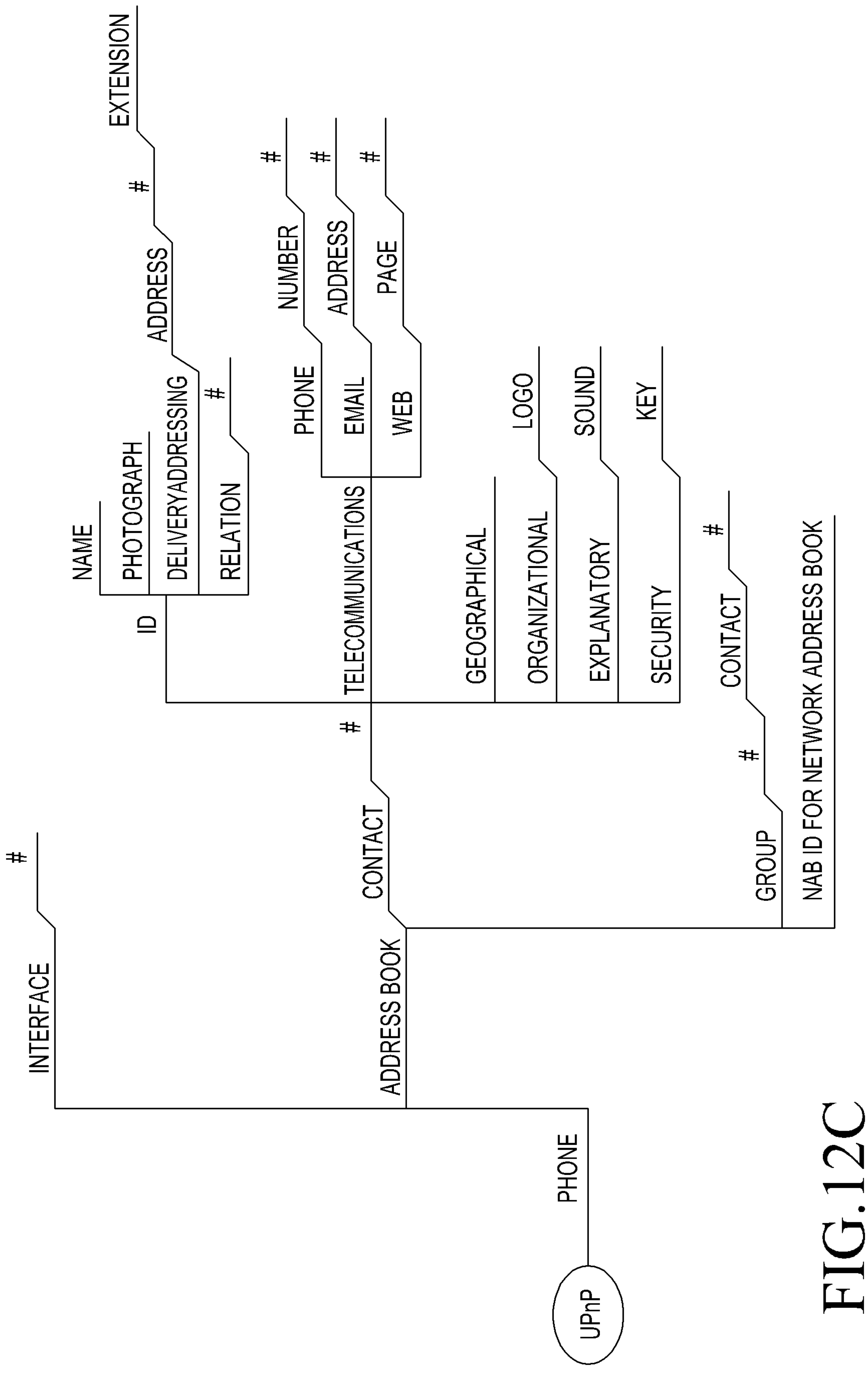
Figure 12D:
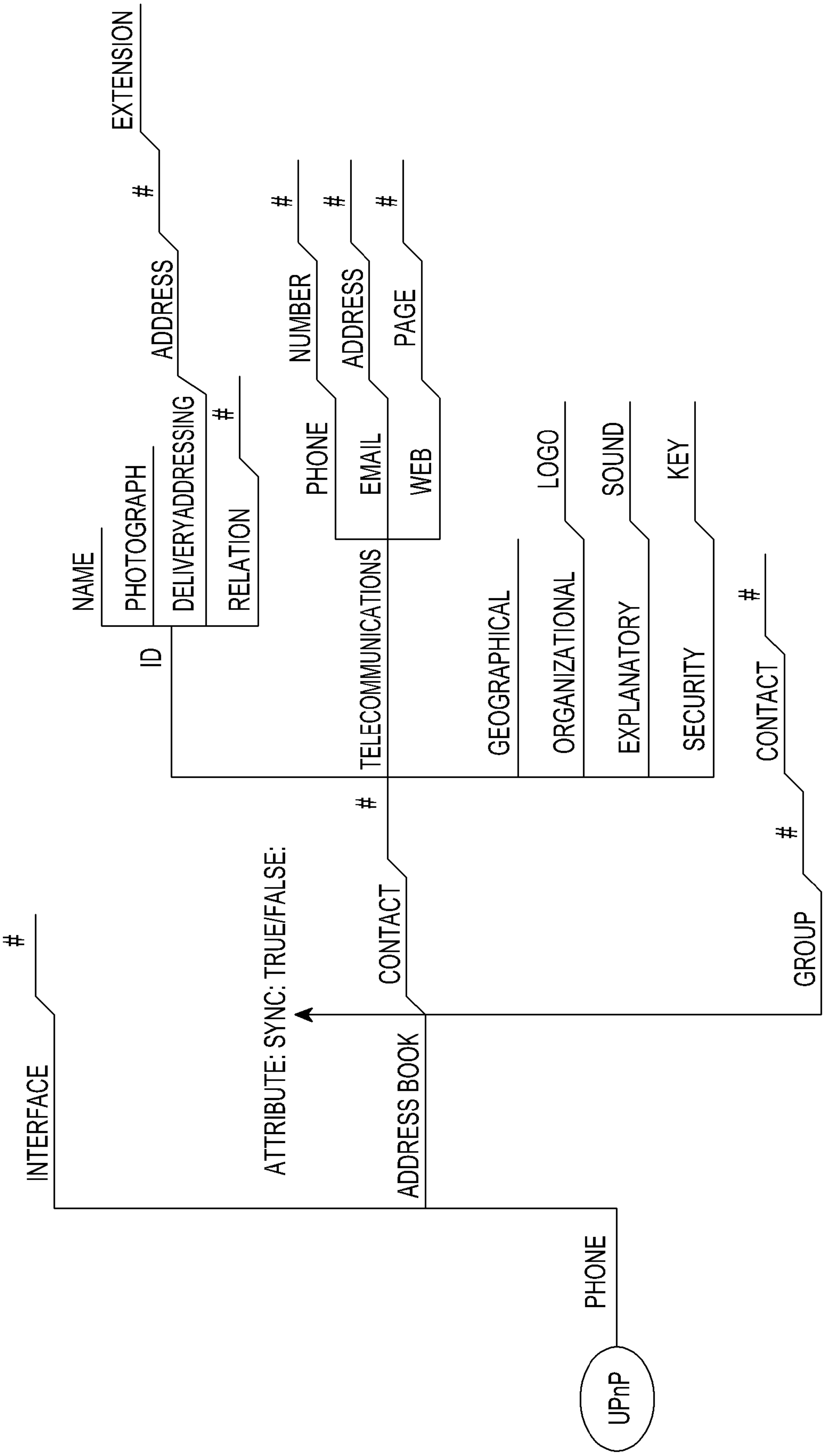

In an additional embodiment of the present invention, the request from the TCP 102A includes a new element as contact entries from the multiple network address books 116A-116N. The new element includes a child element "networkaddressbook" having a network address book identifier with "contact entry" as a child element of the "networkaddressbook", as illustrated in FIG. 12C.

Figure 13:
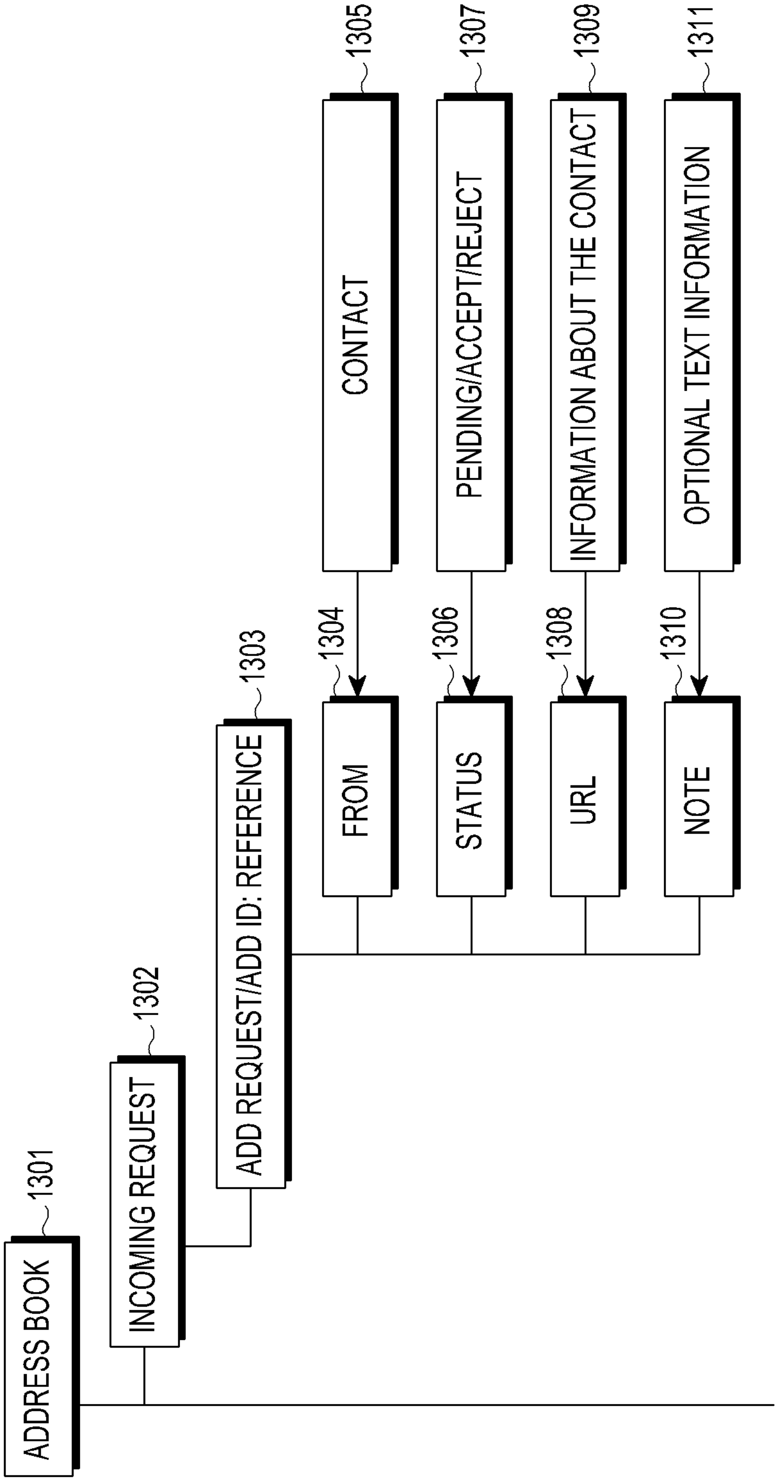
FIG. 13 is a diagram illustrating a schema for handling contact invitation requests, according to an embodiment of the present invention.

In order to handle a contact invitation, a new element "add request" is defined under the element "incoming request", as shown in FIG. 13. The element "add request" captures an incoming request for contact invitations. Each "addrequest" is identified by a reference identifier indicated in the request. The "addrequest" includes a child element "from", which identifies that the entity is in the address book of the TCPs 102A-102N. Also, the "addrequest" includes a child element "status" to identify a status of the request as pending/accepted/rejected. The "addrequest" also includes "URL" and "note" to capture additional information associated with the contact invitation.

For example, when a contact invitation is received from the network address book 116A, the TS 104 creates an entry in the phone data model under the "incoming request", as described above. The TS 104 notifies the appropriate TCP 102A regarding the contact invitation based on the incoming request identifier. The TCP 102A changes the "status" element based on the input from the user and sends a response to the TS 104. The TS 104 then performs a necessary action, as described in FIG. 4.

Figure 14:
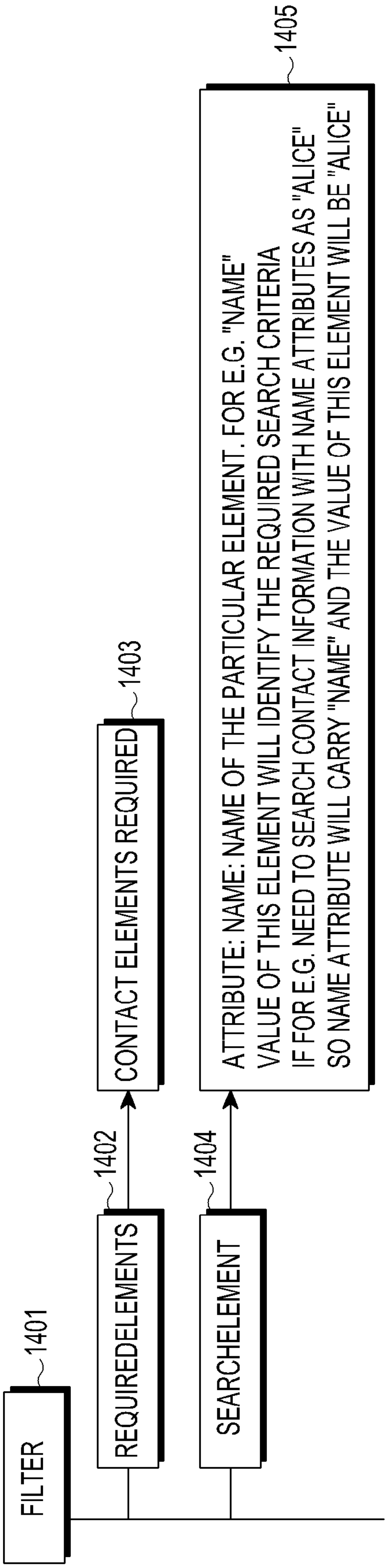
FIG. 14 is a diagram illustrating a schema for searching one or more contact entries in one or more network address books associated with a TCP, according to an embodiment of the present invention.

In order to search for a contact entry in a network address book, the request for a search includes an identifier associated with the network address book, as illustrated in FIG. 14. For a group search, the request may indicate that the contact entry is to be searched for in all network address books 116A-116N associated with the TCP 102A.

Figure 15A:
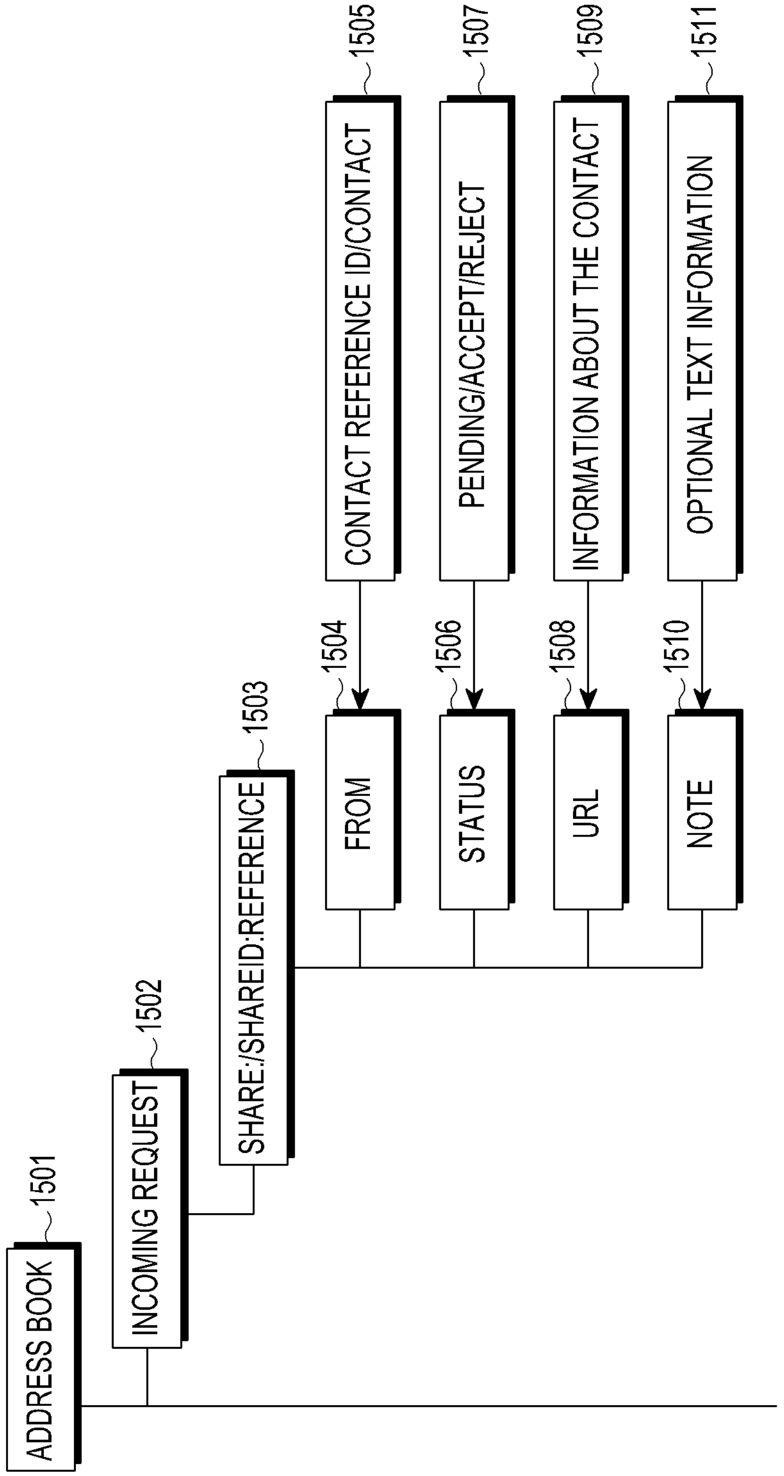
FIGS. 15A and 15B are diagrams illustrating a schema for sharing contact entries with recipients, according to an embodiment of the present invention.

In order to share contact entries, a new element "share contacts" is used to store requests to share the contact entries, as shown in FIG. 15A. The "share contacts" element includes one or more individual share requests, where each individual share request is identified by a unique reference identifier. The element "contact to be shared" carries contact entries to be shared with one or more recipients. Also, the "contact to be shared" may indicate a mode of sharing the contact entries. The "contact elements" indicate contact elements to be shared with the one or more recipients from the local address book and the network address book. The "recipient" indicates the one or more recipients with whom the contact entries are to be shared.

Figure 15B:
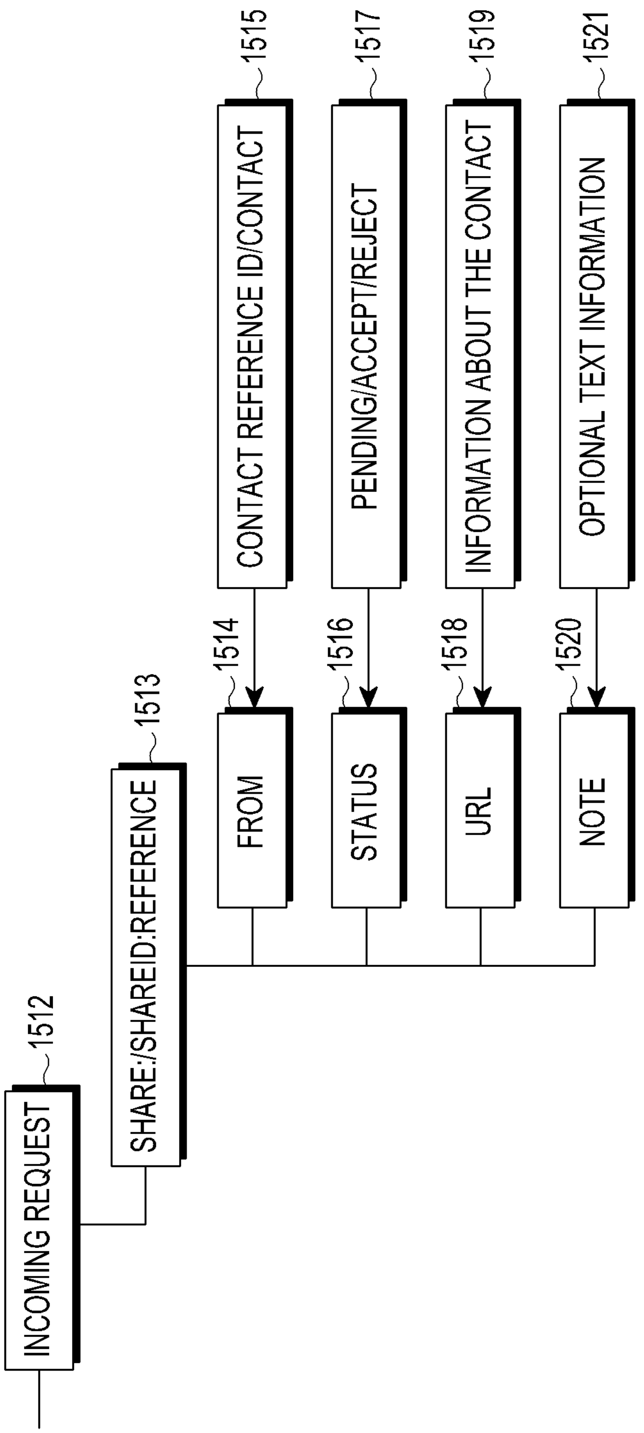

In order to handle incoming requests for sharing contact entries, a new element "add request" is defined under the element "incoming request", as shown in FIG. 15B When there is an incoming request for sharing a contact entry with any of the TCPs 102A-102N, the TS 104 updates the phone data model 802 with the information included in the "IncomingRequest" and sends an event notification to the appropriate TCP 102A. The TCP 102A updates the status identifier in the incoming request to indicate whether the incoming request is accepted. Once the status of the incoming request is changed, the TS 104 performs steps related to the request for sharing contact entries, as described above with respect to FIG. 7.

Figure 9:
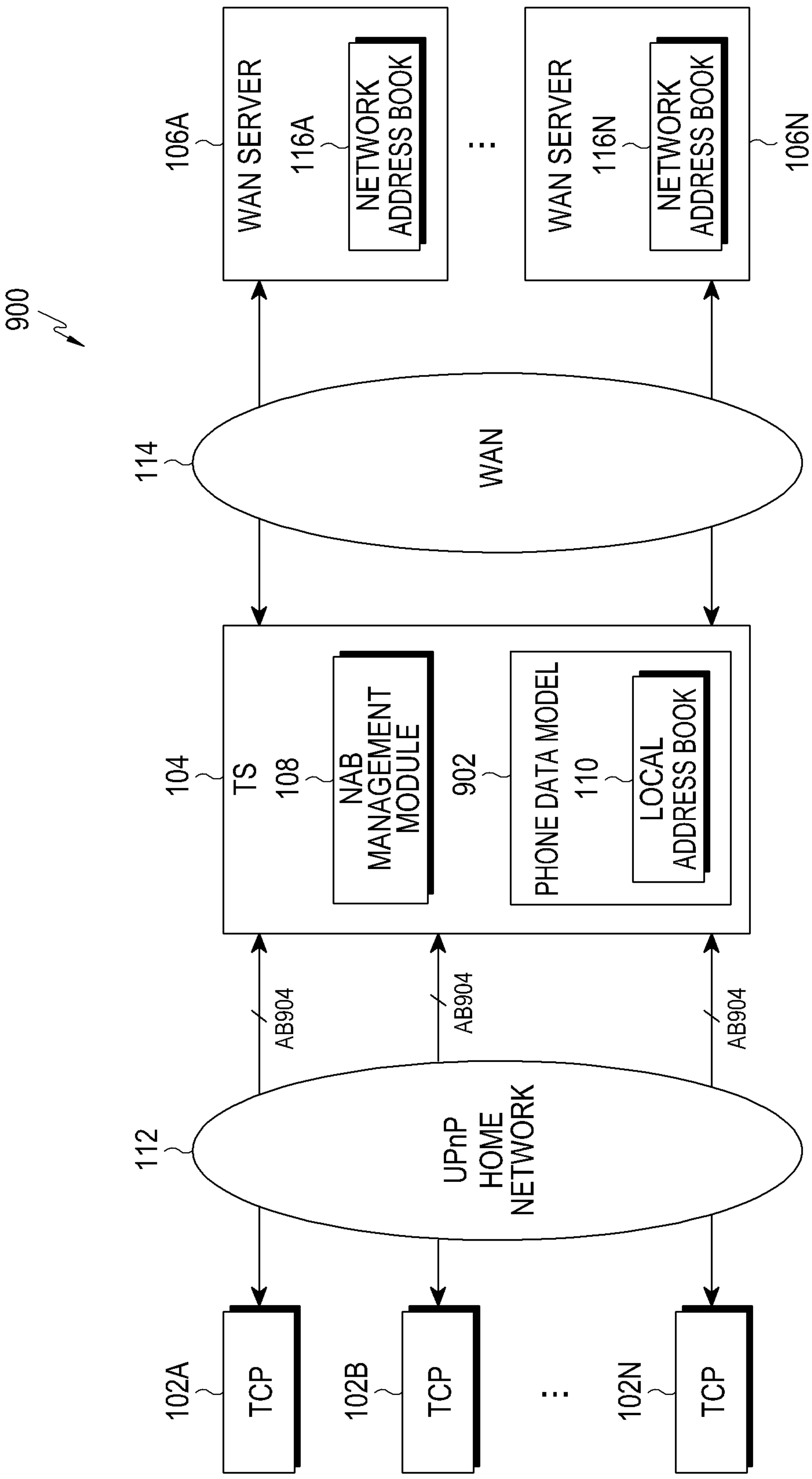
FIG. 9 is a block diagram illustrating a system for managing the one or more network address books associated with the TCPs using an address book interface, according to an embodiment of the present invention.

FIG. 9 is a block diagram illustrating a system 900 for managing the network address books 116A-116N associated with the TCPs 102A-102N using an address book interface 904, according to an embodiment of the present invention. The TS 104 includes the NAB management module 108, and a phone data model 902 having the local address book 110. The NAB management module 108 uses the address book interface 904 to provide advanced address book functionality without extending the phone data model 902, according to one or more embodiments of the present invention described in FIGS. 1-7.

Figure 10:
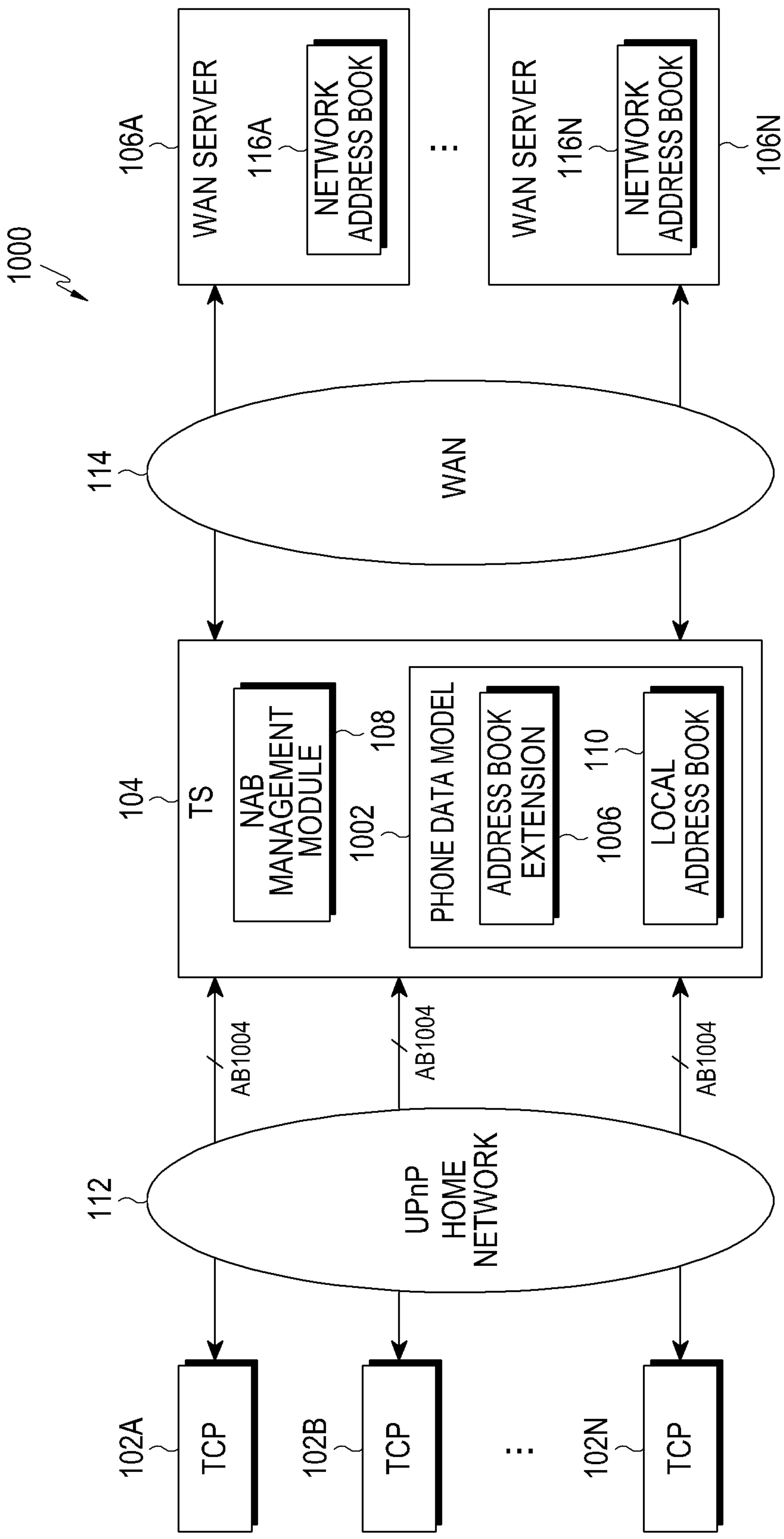
FIG. 10 is a block diagram illustrating a system for managing the one or more network address books associated with the TCPs using an address book interface, according to an embodiment of the present invention.

FIG. 10 is a block diagram illustrating a system 1000 for managing the network address books 116A-116N associated with the TCPs 102A-102N using an address book interface 1004, according to an embodiment of the present invention. The TS 104 includes a phone data model 1002 and the NAB management module 108. In the system 1000, the phone data model 1002 is extended to provide simple address book functionality, such as updating contact entries in the network address books 116A-N and searching contact entries using address book extensions 1006. The NAB management module 108 is used to provide advanced address book functionalities, such as handling contact invitation and sharing contact entries.

Figure 16:
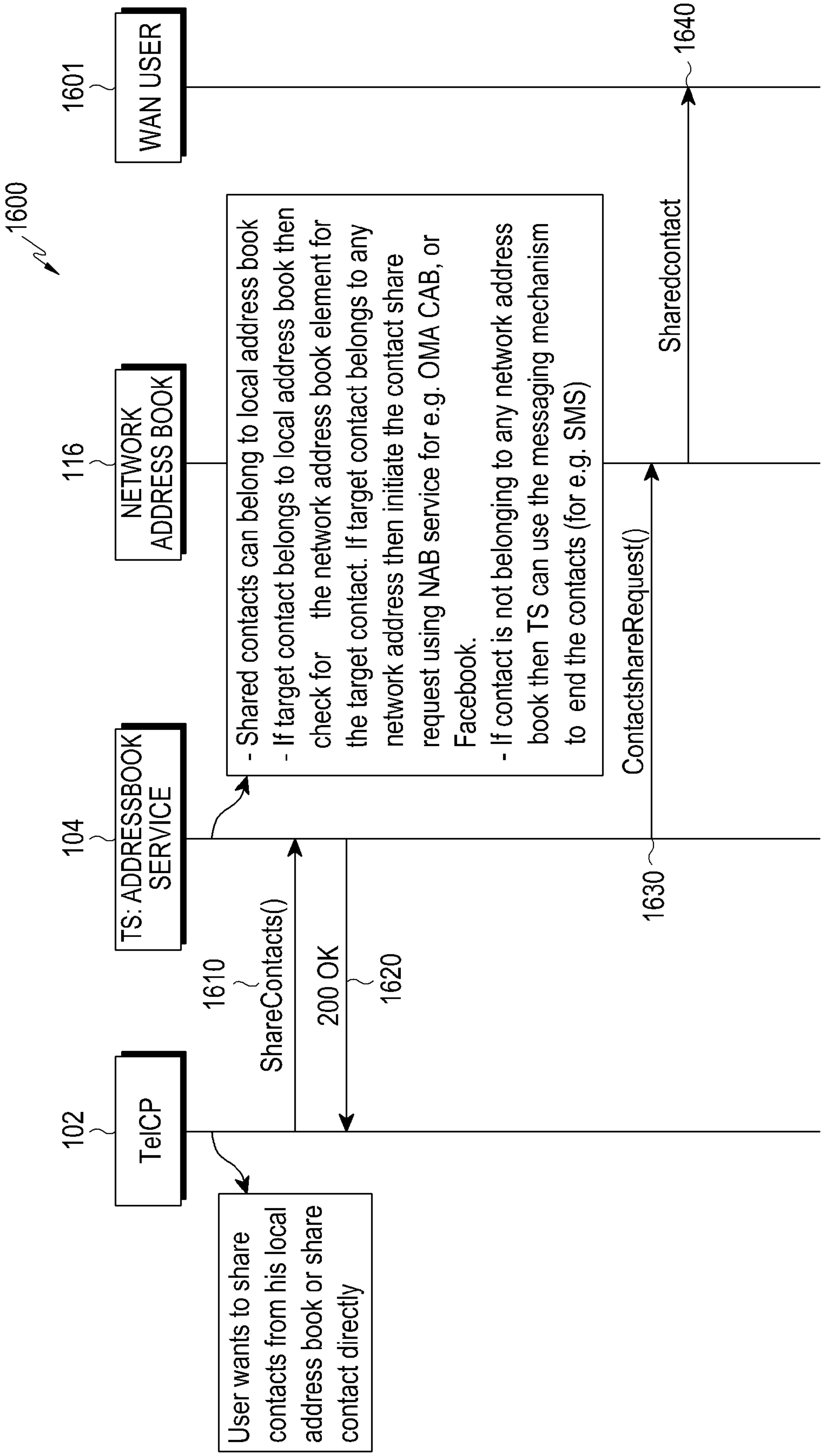
FIG. 16 is a diagram illustrating a method for sharing set of contacts with a WAN user, for the system of FIGS. 9 and 10, according to an embodiment of the present invention.

FIG. 16 is a flow diagram illustrating a method 1600 for sharing of a set of contacts associated in the local address book in the TS 104. In step 1610, the TelCP 102 initiates the ShareContacts ( ) action. In step 1620, the TS 104 sends a 200 OK message to the TelCP 102 in repose to the ShareContacts ( ) action.

This action allows a TelCP 102 to share the set of contacts with the remote party or a WAN user 1601. The contacts can be shared from the local address book stored in the TS 104. The TelCP 102 can share only part of the information instead of the entire information such filter information will be included in the request. This action has following arguments:

The input argument SharedContacts contains the contact information to be shared with the remote party. The Shared- Contacts is an XML structure which include the contact information like contact communication address, name, etc. The contact information can be stored in the local address book in the TS. This argument can contain reference to the entry in the address book.

The input argument Infotoshare contains the list of contact information element to be shared for e.g. name, email etc. This element contains the comma separated contact information element. This argument can contain an empty string to share entire contact information from the local address book.

The input argument Targetcontacts contains the target remote party identifier with whom the contacts need to be shared.

The AddressBook service in the TS 104 first retrieves the contact information to be shared specified by the input argument SharedContacts. The shared contact can include the reference to the contact from local address book. When the local address book is implemented using the Phone Data Model specified in telephony v1, the references will be an instance identifier of the contacts shored in the TS 104 phone data mode. The AddressBook service generates the shared contact information using filter specified in the input argument Infotoshare. In step 1630, the AddressBook generates the contact share request to the remote party specified in the input argument Targetcontacts using the appropriate WAN protocol or network address book 116 associated with WAN user 1601. In step 1640, the network address book 116 sends shared contacts to the WAN user 1601.

Figure 17:
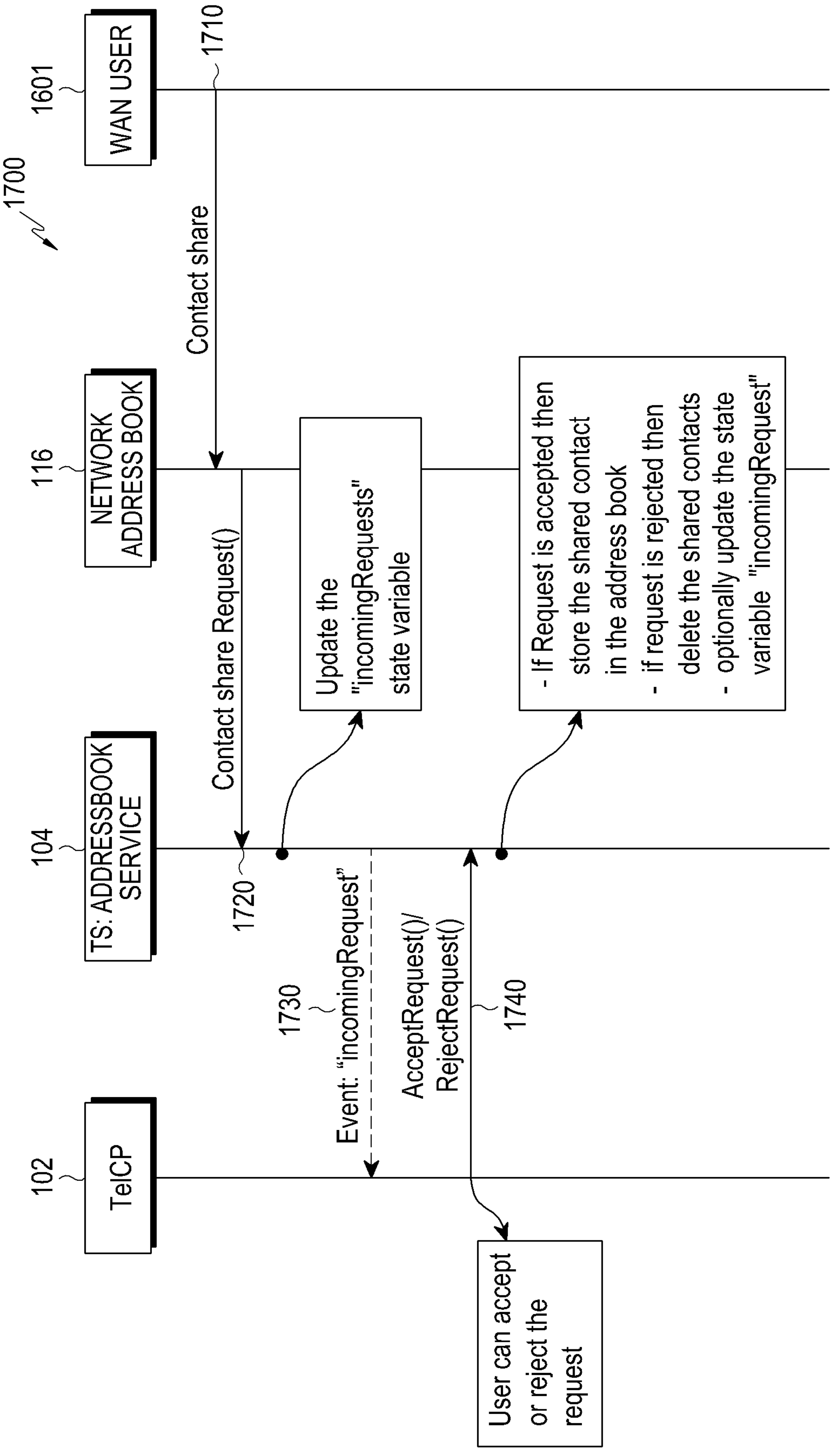
FIG. 17 is a diagram illustrating a method for handling an incoming contact share request for the system of FIGS. 9 and 10, according to an embodiment of present invention.

FIG. 17 is a flow diagram illustrating the method 1700 for handling an incoming contact share request from the WAN user 1601. In steps 1710 and 1720, the TS 104 receives a contact share request from the WAN user 1601 via network address book 116. In step 1730, the TS 104 updates the internal incomingRequest state variable associated with the AddressBook service in the TS 104. The updates to the state variable is evented to the TelCP 102. In step 1740, the TelCP 102 can accept or reject the incoming request by initiating the AcceptRequest or RejectRequest action to the TS 104.

This AcceptRequest( ) action allows a TelCP 102 to accept the incoming request identified by the unique identifier of the request in the input argument RequestID. The AddressBook service in the TS 104 executes the incoming request which is identified by the RequestID.

The AddressBook service accepts the contact share request and store the set of contacts into the local address book shared by the remote party or a WAN user 1601.

Figure 18:
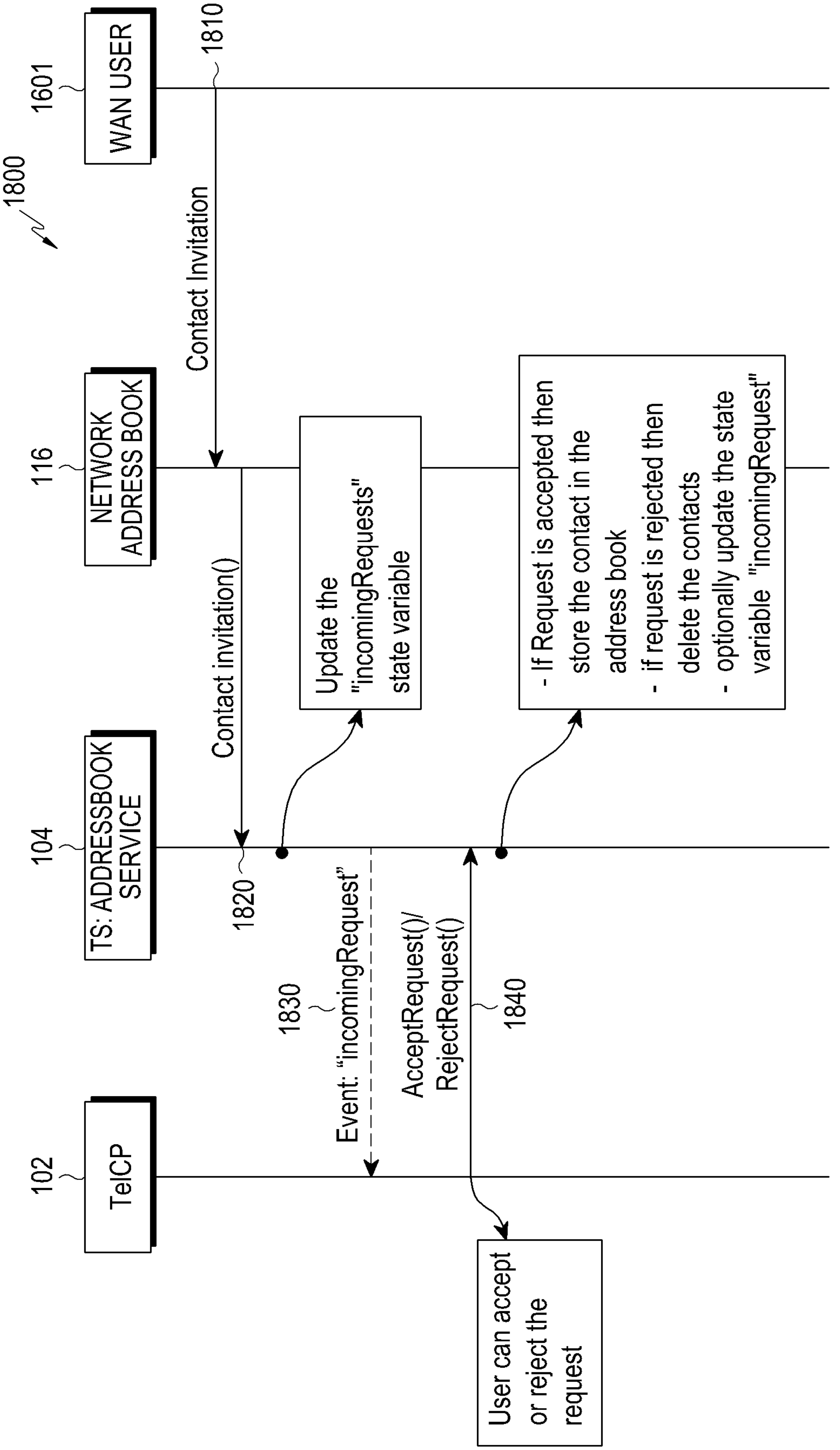
FIG. 18 is a diagram illustrating a method for handling an incoming contact invitation request for the system of FIGS. 9 and 10, according to an embodiment of present invention.

FIG. 18 is a flow diagram illustrating the method 1800 for handling an incoming contact invitation request from the WAN user 1601. In steps 1810 and 1820, the TS 104 receives a contact invitation request from the WAN user 1601 via network address book 116. In step 1830, the TS 104 updates the internal incomingRequest state variable associated with the AddressBook service in the TS 104. The updates to the state variable are evented to the TelCP 102. In step 1840, the TelCP 102 can accept or reject the incoming request by initiating the AcceptRequest or RejectRequest action to the TS 104.

This AcceptRequest( ) action allows a TelCP 102 to accept the incoming request identified by the unique identifier of the request in the input argument RequestID. The AddressBook service in the TS 104 executes the incoming request which is identified by the RequestID.

The AddressBook service accepts the mutual contact information sharing. The service includes the remote party or WAN User 1601 contact information into the local address book in the TS and share contact information of a user to the remote party.

FIG. 19 illustrates the structure for the incomingRequest state variable associated with the AddressBook service for handling of the contact invitation and contact share request for the system of FIGS. 9 and 10.

The format of the incomingRequest state variable is an XML document. It includes information about the incoming address book handling requests from the WAN side such as incoming contact sharing request or contact invitation. It contains all the necessary information (like type of a incoming request, initiator of the request, unique request identifier and other addition information etc) about the incoming request to handle (i.e. accept or reject the incoming request) a particular request.

The incomingRequest state variable is evented when AddressBook service receives an incoming contact share request, or incoming contact invitation request.

<xml>
REQUIRED. Case Sensitive.
<incomingRequest>
REQUIRED. MUST include the name space declaration for the complex type <peerType> ("urn:schemas-upnp-org:phone:peer") and the namespace declaration for the AddressBook service Schema ("urn:schemas upnp org:phone:addressbook"). This namespace "urn:schemas upnp org:phone:addressbook" defines the following elements and attributes:
<request>
OPTIONAL. This element includes the required information for all the incoming address book handling requests. This element includes the type of an incoming request, unique identifier for the request, status of the request, etc. This element can appear zero or more times. This element includes following sub-elements:
<type>
REQUIRED: This element indicates the type of an incoming request. The possible type of the incoming requests are "ContactShare", and "Contactinvitation".
<ReqID>
REQUIRED: Unique identifier for the incoming request.
<fromcontactid>
REQUIRED: This element identifies the request originator.
<status>
REQUIRED: This element indentifies the status of the incoming request for, e.g. "pending"
<note>
OPTIONAL: This element contains textual information for corresponding information.
< sharedinformationURL>
OPTIONAL: This element contains the URL which will include detailed information for the incoming request.

Figure 11:
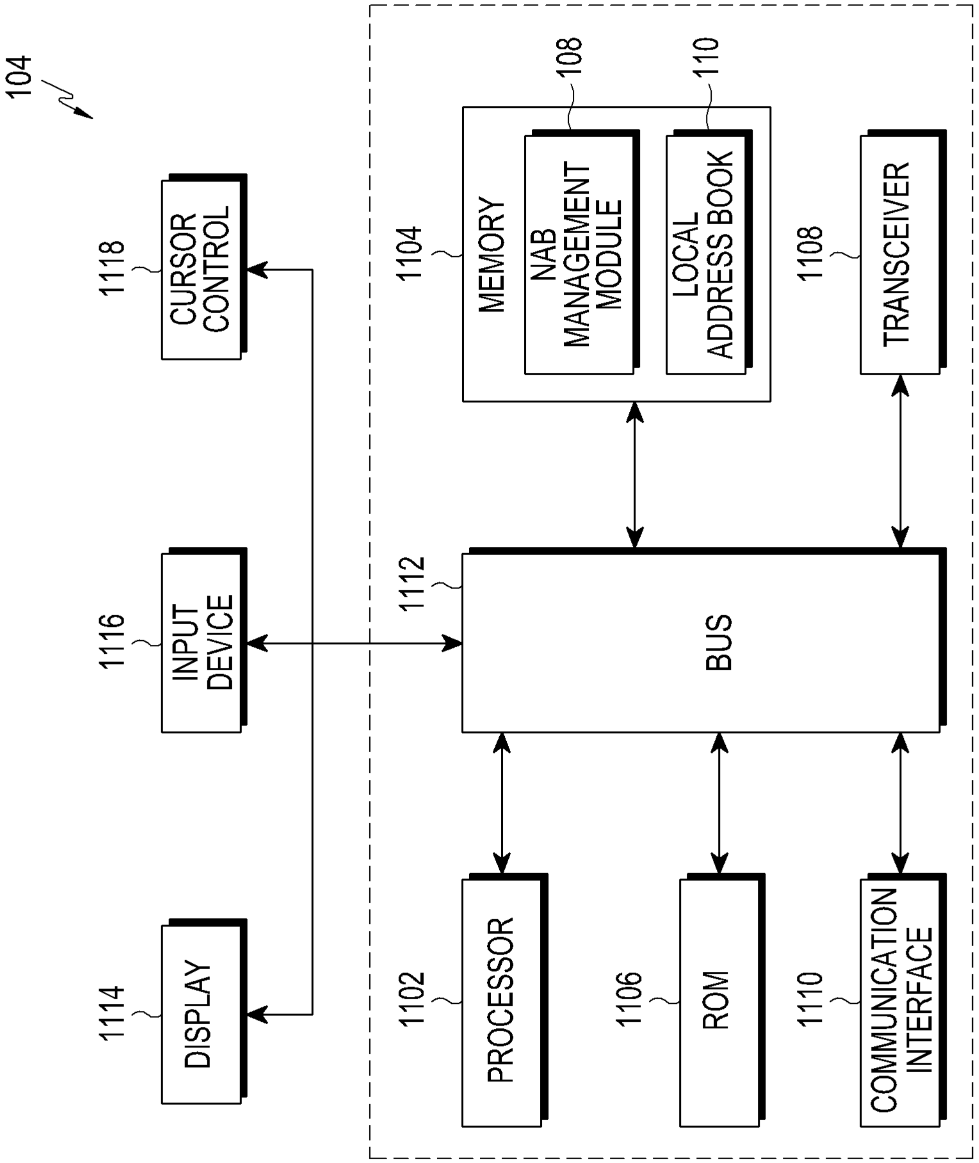
FIG. 11 is a block diagram illustrating a the TS showing various components, according to an embodiment of the present invention.

FIG. 11 is a block diagram of the TS 104 showing various components, according to an embodiment of the present invention. The TS 104 includes a processor 1102, a memory 1104, a Read Only Memory (ROM) 1106, a transceiver 1108, a communication interface 1110, a bus 1112, a display 1114, an input device 1116, and a cursor control 1118.

The processor 1102, as used herein, refers to any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1102 may also include embedded controllers, such as generic or programmable logic devices or arrays, application specific integrated circuits, single-chip computers, smart cards, and the like.

The memory 1104 may be volatile memory or non-volatile memory. The memory 1104 includes the NAB management module 108 and the local address book 110. The NAB management module 108 is in the form of instructions stored therein to provide advanced address book functionality using the network address books 116A-116N in the WAN servers 106A-106N to the TCPs 102A-102N, according to the embodiments of the present invention. A variety of computer-readable storage media may be stored in and accessed from the memory elements. Memory elements may include any suitable memory device(s) for storing data and machine-readable instructions, such as ROM, Random Access Memory (RAM), erasable programmable ROM, electrically erasable programmable ROM, hard drive, removable media drive for handling memory cards, Memory Sticks™, and the like.

Embodiments of the present invention may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 1102. For example, a computer program may include machine-readable instructions capable of providing advanced address book functionality in a UPnP domain using the network address books 116A-116N in the WAN servers 106A-106N to the TCPs 102A-102N, according to the teachings and herein described embodiments of the present invention. In an embodiment of the present invention, the computer program may be included on a storage medium and loaded from the storage medium to a hard drive in the non-volatile memory.

The components such as the transceiver 1108, communication interface 1110, display 1114, input device 1116, and cursor control 1118 are well known those skilled in the art.

The various devices, modules, selectors, estimators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

While the invention has been shown and described with reference to certain embodiments thereof, it will be under stood by those skilled in the art that various changes in form and detail may be made therein without departing from the spirit and scope of the invention as defined by the appended claims.

What is claimed is:

1. A method, at a Telephony Server (TS) in a network, for managing at least one network address book of a user, comprising the steps of:

receiving, by the TS, a request to update a contact entry from a Telephony Control Point (TCP) that is coupled to the TS in the network, wherein the request comprises contact information associated with at least one entity of the contact entry, and an address book identifier of a source of the contact entry;

determining whether the address book identifier in the request is associated with any of one or more network address books in one or more Wide Area Network (WAN) servers coupled to the TS via a WAN;

when the address book identifier is associated with at least one of the one or more network address books, updating the contact entry in the at least one network address book based on the contact information; and when the address book identifier is not associated with any of the one or more network address books, updating the contact entry in a local address book in the TS based on the contact information.

2. The method of claim 1, wherein the one or more network address books associated with the TCP comprise a service provider address book associated with a service provider, and one or more social network address books associated with one or more social networks.

3. The method of claim 1, wherein, in updating the contact entry, the contact entry is added to, deleted from or modified at the at least one network address book.

4. The method of claim 1, wherein updating the contact entry comprises:

representing the contact entry in the local address book of the TS based on the contact information in the request;

identifying the at least one network address book from the one or more network address books based on the address book identifier in the request; and synchronizing the contact entry represented in the local address book with a corresponding entry of the at least one network address book using the WAN.

5. The method of claim 1, further comprising:

receiving, by the TS, a request for importing contact entries from the one or more network address books, from the TCP;

establishing a WAN connection with the one or more WAN servers including the one or more network address books; and importing the contact entries from the one or more network address books to the local address book.

6. The method of claim 1, further comprising:

receiving, by the TS, a request for searching for a contact entry in the one or more network address books, from the TCP, wherein the request comprises a contact search query;

establishing a WAN connection with the one or more WAN servers including the one or more network address books;

searching for the contact entry in the one or more network address books based on the contact search query; and returning search results to the TCP upon successfully searching the one or more network address books.

7. The method of claim 1, further comprising:

receiving, by the TS, a contact invitation from one of the one or more network address books, wherein the contact invitation comprises a contact entry associated with an entity;

forwarding the contact invitation to the TCP;

receiving, by the TS, a response with a status identifier from the TCP for the contact invitation;

determining whether the contact invitation is accepted by the TCP based on the status identifier in the response;

when the contact invitation is accepted, adding the contact entry to the one of the one or more network address books; and when the contact invitation is not accepted, notifying the one of the one or more network address books that the contact invitation is rejected by the TCP.

8. A Telephony Server (TS) for managing one or more network address books associated with a Telephony Control Point (TCP) in a network, comprising:

a processor; and a memory coupled to the processor, wherein the memory includes a Network Address Book (NAB) management module capable of:

receiving, by the TS, a request to update a contact entry from the TCP that is coupled to the TS, wherein the request comprises contact information associated with at least one entity of the contact entry and an address book identifier of a source of the contact entry;

determining whether the address book identifier in the request is associated with any of one or more network address books in one or more Wide Area Network (WAN) servers coupled to the TS via a WAN;

when the address book identifier is associated with at least one of the one or more network address books, updating the contact entry in the at least one network address book based on the contact information; and when the address book identifier is not associated with any of the one or more network address books, updating the contact entry in a local address book in the TS based on the contact information.

9. The TS of claim 8, wherein the one or more network address books associated with the TCP comprise a service provider address book associated with a service provider, and one or more social network address books associated with one or more social networks.

10. The TS of claim 8, wherein, in updating the contact entry, the contact entry is added to, deleted from or modified at the at least one network address book.

11. The TS of claim 10, wherein, in updating the contact entry, the NAB management module represents the contact entry in the local address book of the TS based on the contact information in the request, identifies the at least one network address book from the one or more network address books based on the address book identifier in the request, and synchronizes the contact entry represented in the local address book with a corresponding entry of the at least one network address book using the WAN.

12. The TS of claim 8, wherein the NAB management module is further capable of:

receiving, by the TS, a request for importing contact entries from the one or more network address books, from the TCP;

establishing a WAN connection with the one or more WAN servers including the one or more network address books; and importing the contact entries from the one or more network address books to the local address book.

13. The TS of claim 8, wherein the NAB management module is further capable of:

receiving, by the TS, a request for searching for a contact entry in the one or more network address books, from the TCP, wherein the request comprises a contact search query;

establishing a WAN connection with the one or more WAN servers including the one or more network address books;

searching for the contact entry in the one or more network address books based on the contact search query; and returning search results to the TCP upon successfully searching the one or more network address books.

14. The TS of claim 8, wherein the NAB management module is further capable of:

receiving, by the TS, a contact invitation from one of the one or more network address books, wherein the contact invitation comprises a contact entry associated with an entity;

forwarding the contact invitation to the TCP;

receiving, by the TS, a response including a status identifier from the TCP for the contact invitation;

determining whether the contact invitation is accepted by the TCP based on the status identifier in the response;

when the contact invitation is accepted, adding the contact entry to the one of the one or more network address books; and when the contact invitation is not accepted, notifying the one of the one or more network address books that the contact invitation is rejected by the TCP.

15. A non-transitory computer-readable storage medium having instructions stored therein, that when executed by a Telephony Server (TS), cause the TS to perform a method comprising the steps of:

receiving, by the TS, a request to update a contact entry from a Telephony Control Point (TCP) that is coupled to the TS, wherein the request comprises contact information associated with at least one entity of the contact entry and an address book identifier of a source of the contact entry;

determining whether the address book identifier in the request is associated with any of one or more network address books in one or more Wide Area Network (WAN) servers coupled to the TS via a WAN;

when the address book identifier is associated with at least one of the one or more network address books, updating the contact entry in the at least one network address book based on the contact information; and when the address book identifier is not associated with any of the one or more network address books, updating the contact entry in a local address book in the TS based on the contact information.

16. The storage medium of claim 15, wherein the instructions to update the contact entry comprises:

representing the contact entry in the local address book of the TS based on the contact information in the request;

identifying the at least one network address book from the one or more network address books based on the address book identifier in the request; and synchronizing the contact entry represented in the local address book with a corresponding entry of the at least one network address book using the WAN.

17. The storage medium of claim 15, wherein the method further comprises:

receiving, by the TS, a request for importing contact entries from the one or more network address books, from the TCP;

establishing a WAN connection with the one or more WAN servers including the one or more network address books; and importing the contact entries from the one or more network address books to the local address book.

18. The storage medium of claim 15, wherein the method further comprises:

receiving, by the TS, a request for searching for a contact entry in the one or more network address books, from the TCP, wherein the request comprises a contact search query;

establishing a WAN connection with the one or more WAN servers including the one or more network address books;

searching for the contact entry in the one or more network address books based on the contact search query; and returning search results to the TCP upon successfully searching the one or more network address books.

19. The storage medium of claim 15, wherein the method further comprises:

receiving, by the TS, a contact invitation from one of the one or more network address books, wherein the contact invitation comprises a contact entry associated with an entity;

forwarding the contact invitation to the TCP;

receiving, by the TS, a response including a status identifier from the TCP for the contact invitation;

determining whether the contact invitation is accepted by the TCP based on the status identifier in the response;

when the contact invitation is accepted, adding the contact entry to the one of the one or more network address books; and when the contact invitation is not accepted, notifying the one of the one or more network address books that the contact invitation is rejected by the TCP.

* * * * *